(12) United States Patent  (10) Patent No.: US 9,379,951 B2
Mihnev  (45) Date of Patent: Jun. 28, 2016

(54) METHOD AND APPARATUS FOR DETECTION OF ANOMALIES IN INTEGRATED PARAMETER SYSTEMS

(71) Applicant: Instep Software, LLC, Chicago, IL (US)

(72) Inventor: Aldimir Mihnev, Chicago, IL (US)

(73) Assignee: Instep Software, LLC, Chicago, IL (US)

( * ) Notice: Subject to any disclaimer, the term of this patent is extended or adjusted under 35 U.S.C. 154(b) by 194 days.

(21) Appl. No.: 14/152,761

(22) Filed: Jan. 10, 2014

(65) Prior Publication Data

US 2015/0199224 A1  Jul. 16, 2015

(51) Int. Cl.
  *G06F 11/00* (2006.01)
  *H04L 12/26* (2006.01)
  *G06F 11/07* (2006.01)
  *G06F 11/30* (2006.01)

(52) U.S. Cl.
  CPC .......... *H04L 43/045* (2013.01); *G06F 11/0709* (2013.01); *G06F 11/0751* (2013.01); *G06F 11/30* (2013.01)

(58) Field of Classification Search
  USPC .......................................................... 714/37
  See application file for complete search history.

(56) References Cited

U.S. PATENT DOCUMENTS

| | | | |
|---|---|---|---|
| 6,181,975 B1 | 1/2001 | Gross | |
| 7,124,438 B2 | 10/2006 | Judge | |
| 7,136,864 B2 | 11/2006 | Jeon | |
| 7,349,746 B2 | 3/2008 | Emigholz | |
| 7,574,409 B2 * | 8/2009 | Patinkin | 706/12 |
| 7,779,466 B2 | 8/2010 | Judge | |
| 7,782,197 B2 | 8/2010 | Lang | |
| 7,792,660 B2 | 9/2010 | Iyengar | |
| 7,802,144 B2 | 9/2010 | Vinberg | |
| 7,818,276 B2 | 10/2010 | Veillette | |
| 7,826,990 B2 | 11/2010 | Nasle | |
| 7,840,296 B2 | 11/2010 | Sanford | |
| 7,912,676 B2 | 3/2011 | Miller | |
| 7,966,150 B2 | 6/2011 | Smith | |
| 8,676,725 B1 * | 3/2014 | Lin et al. | 706/12 |
| 8,712,930 B1 * | 4/2014 | Covell et al. | 706/12 |
| 2005/0240943 A1 * | 10/2005 | Smith et al. | 719/328 |
| 2007/0005277 A1 * | 1/2007 | Bickel et al. | 702/61 |
| 2007/0050777 A1 | 3/2007 | Hutchinson | |
| 2009/0326885 A1 * | 12/2009 | Rubin et al. | 703/6 |
| 2010/0131248 A1 * | 5/2010 | Green et al. | 703/2 |
| 2010/0141421 A1 | 6/2010 | Lagnelov | |
| 2011/0060704 A1 * | 3/2011 | Rubin et al. | 706/12 |
| 2012/0032814 A1 | 2/2012 | Radovilsky | |
| 2012/0131674 A1 | 5/2012 | Wittenschlaeger | |
| 2012/0151453 A1 * | 6/2012 | Finking et al. | 717/130 |
| 2012/0240185 A1 | 9/2012 | Kapoor | |
| 2012/0271587 A1 | 10/2012 | Shibuya | |
| 2012/0278015 A1 | 11/2012 | Budhraja | |
| 2012/0278477 A1 | 11/2012 | Terrell | |
| 2014/0279779 A1 * | 9/2014 | Zou et al. | 706/25 |

* cited by examiner

*Primary Examiner* — Kamini Patel
(74) *Attorney, Agent, or Firm* — Shams, Rodriguez & Mozwecz; Jennifer Mozwecz

(57) ABSTRACT

A system, method, and tangible computing apparatus is disclosed for the detection of anomalies in an integrated data network. Said system, method and apparatus comprises the creation and construction of a mathematical model that utilizes multi-dimensional mutual information to detect interactions and interrelationships between pairs of data streams and among pluralities of data streams. Real-time analysis of the operations of an integrated data network is enhanced and expedited via use of locality sensitive hashing that relies on density determinations of clusters of data.

10 Claims, 19 Drawing Sheets

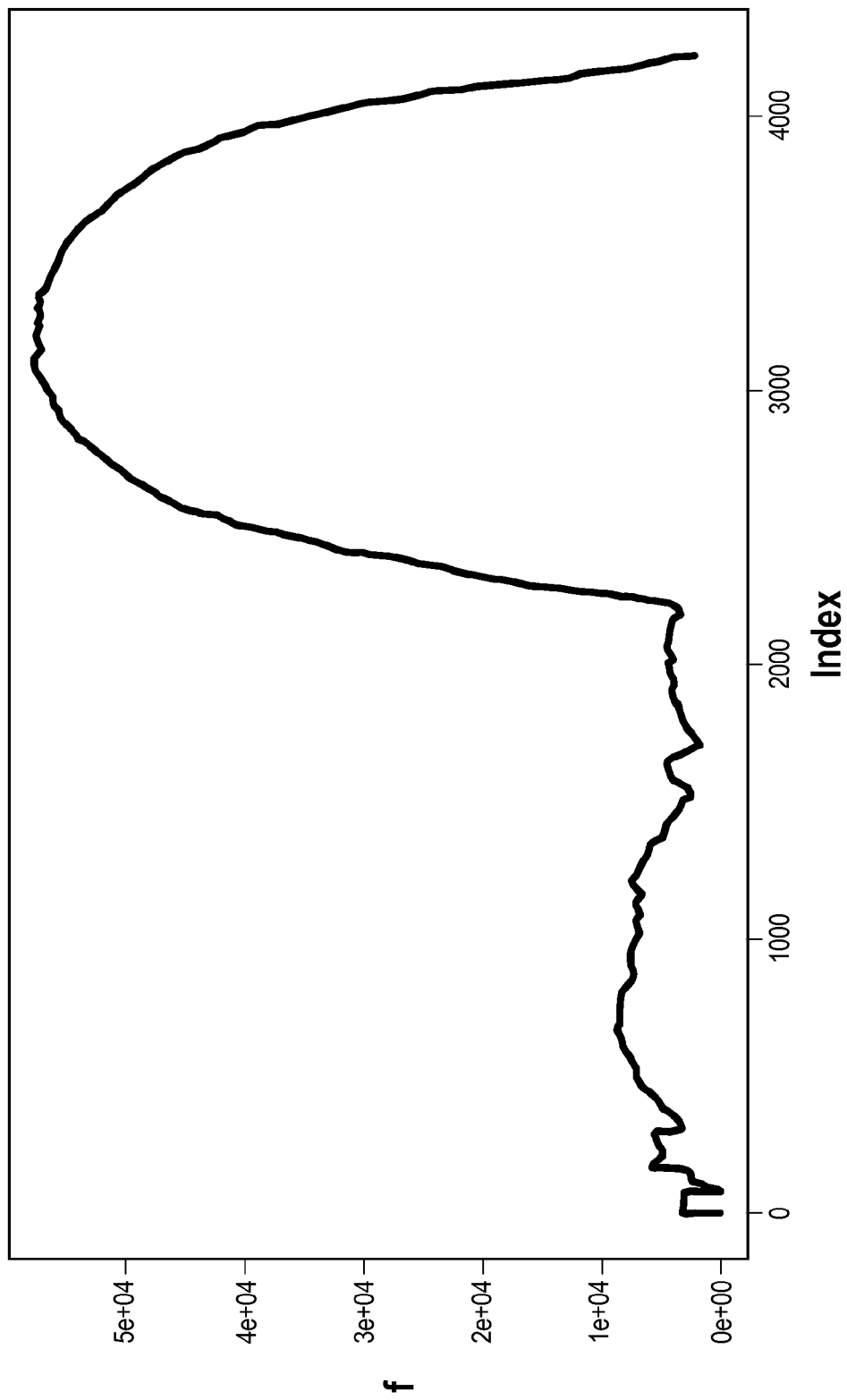

Fig. 9

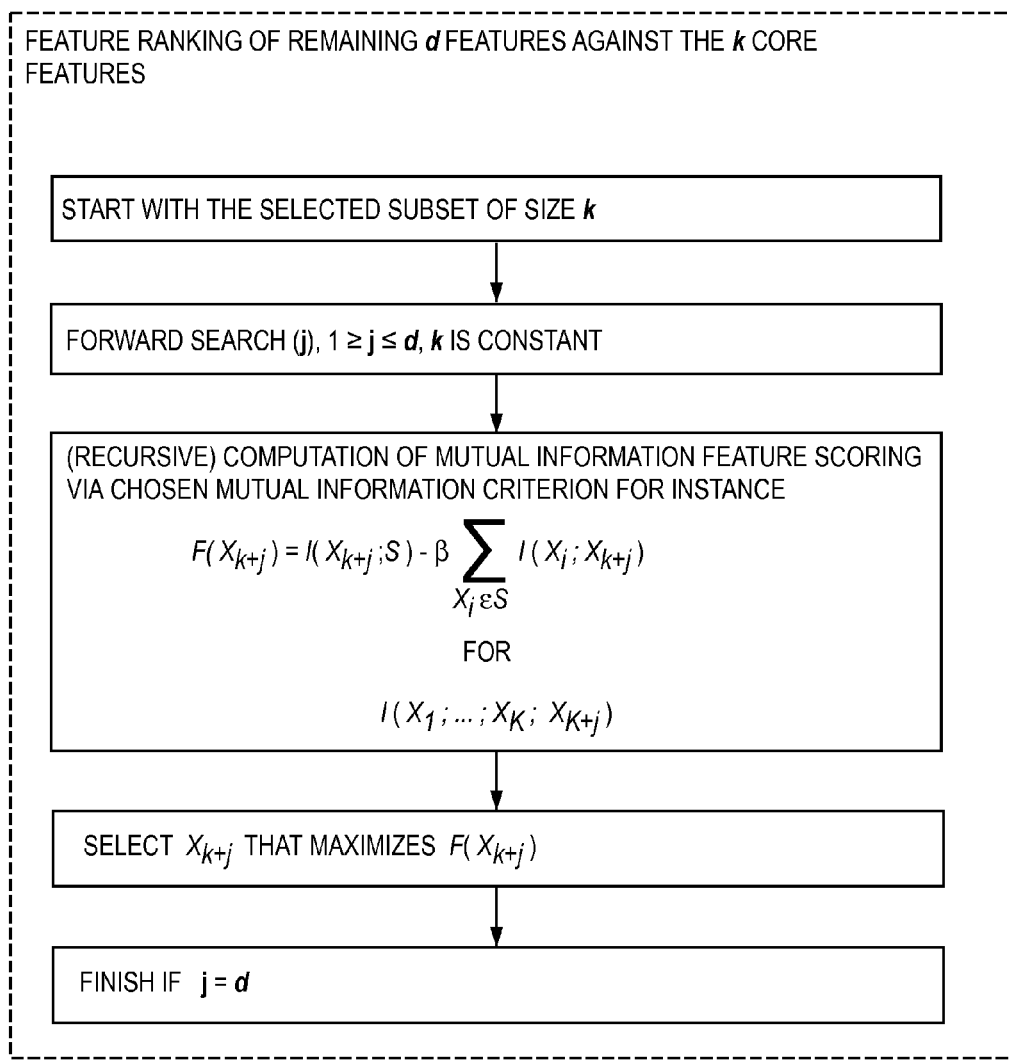

FEATURE RANKING OF REMAINING $d$ FEATURES AGAINST THE $k$ CORE FEATURES

START WITH THE SELECTED SUBSET OF SIZE $k$

FORWARD SEARCH (j), $1 \geq j \leq d$, $k$ IS CONSTANT (RECURSIVE) COMPUTATION OF MUTUAL INFORMATION FEATURE SCORING VIA CHOSEN MUTUAL INFORMATION CRITERION FOR INSTANCE $$F(X_{k+j}) = I(X_{k+j};S) - \beta \sum_{X_i \in S} I(X_i;X_{k+j})$$

FOR $$I(X_1;...;X_K;X_{K+j})$$

SELECT $X_{k+j}$ THAT MAXIMIZES $F(X_{k+j})$

FINISH IF $j = d$

METHOD AND APPARATUS FOR DETECTION OF ANOMALIES IN INTEGRATED PARAMETER SYSTEMS

FIELD OF THE INVENTION

This invention relates generally to a method and apparatus that can be utilized in systems that are characterized by a plurality of integrated parameters, and that can detect parameter anomalies and variances in real time as a function of comparisons between current and historical data parameters. These integrated parameter systems include multiple individual and inter-connected components, each of which may generate multiple data streams that can be measured and recorded to provide a model of the systems' operations under a plurality of operating conditions. More specifically, this invention provides a method and apparatus that may be implemented in an integrated parameter system to flag anomalies and variances in that system as they occur, thus facilitating a rapid response from system managers.

BACKGROUND AND RELATED ART

Integrated parameter systems are prevalent in virtually every industry and throughout large integrated networks, for example, from single-location manufacturing facilities through multi-location conglomerated systems, and up through and across large, geographically diverse communications platforms. As these systems become more complex and diversified over enormous geographic ranges, and as they come to include system nodes that are not readily identifiable as having a single geographic situs (e.g. nodes and servers within an internet application platform), the prospect of failures within these systems becomes more endemic. The plurality of environments under which these integrated parameter systems operate may further include a broad and complex range of conditions. Under these circumstances, it will be difficult or impossible for a system administrator to determine if a set of data that is not within an expected operating range represents normal or abnormal operation of the network. Administrators are thus charged with monitoring increasingly complex integrated parameter systems that include multiple nodes, each of which can generate millions or billions of data points with each passing second, and that can fail catastrophically if any system node or series of system nodes collapses or the system itself is attacked by an external threat. Objective knowledge of what constitutes normal or abnormal operation of an integrated data network will allow a system administrator or engineer to address a developing problem before abnormal operation leads to catastrophic failure of the entire system Engineers have proposed and developed numerous methods and tools to facilitate the monitoring of complex integrated parameter systems. Those methods and tools typically involve creating mathematical models based on historical data that reflect a system's normal operations under various environmental conditions, and then comparing real-time data with the model that is based on historical data. These methods have strong utility in addressing unique aspects of potential collapses or specific types of external attacks, but they are equally limited in that they generally address only specific possible failures or attacks without being adaptable to address other unknown types of failures or attacks. Moreover, a majority of existing systems rely on an administrator's or an engineer's knowledge and expertise to identify anomalies, but that knowledge can be limited or skewed by individual biases or assumptions regarding the interconnectivity of two or more data streams that are generated by individual nodes within the network. Eliminating these biases is a critical goal of many monitoring methodologies.

For example, the vector-based anomaly detection system in US Patent Application Publication 2012/013674 A1 describes a method to detect anomalies in a multi-node network fabric comprising the mapping of a baseline vector that is based on specific metrics within the network, and then flagging variations from that baseline vector at any node. The baseline vector is essentially a mathematical model and the system flags data that falls outside of the boundaries of the model. This technique is useful at a micro level in that it can detect anomalies at individual points within a network, but it is not readily scalable to detect anomalies that may affect increasingly complex integrated parameter systems that include hundreds or thousands of nodes and potentially millions of data points. Moreover, by focusing on individual nodes this method accords equal treatment to each data point and each observation, which may not be valid and it places undue emphasis on an administrator's identification of signals that may be interrelated or correlated. An administrator's bias or incorrect assumptions regarding interconnectivity will limit the utility of the system described in this Publication.

US Patent Publication 2012/0240185 adopts a somewhat broader approach by seeking to establish patterns within a system or network, and particularly a computer network, where those patterns are specific to aspects of the network that are uniquely susceptible to specific forms of threats. Again, the patterns are mapped into a form of a mathematical model that is viewed as a baseline of normal operations. The technology described in this Publication is specific to computer networks and is not readily scalable to the broader category of integrated parameter systems.

U.S. Pat. No. 7,394,746 further broadens this conceptual framework into a more scalable system by describing a method for mining historical databases of operations of chemical refineries to detect patterns, and then flagging events as anomalies if they fall outside of the established pattern. The patterns so detected rely on known relationships among variables, and this system is not readily adaptable when data points are not correlated or when false assumptions about those correlations are incorporated into the system.

Another mode of pattern detection and modeling is disclosed in US Patent Publication 2012/0278477, which describes a modeling method that is a function of one type of data that is drawn from particular nodes within an integrated data network. Like other prior art methods, the method described in this Publication draws patterns out of data streams that are generated within an integrated data system, yet neither this method nor the other prior art systems disclose a broad and robust methodology that can be adapted across virtually any integrated parameter system. Also as noted, much or most of the prior art fails to eliminate administrator or engineer biases and, accordingly, the prior art may include false assumptions about the interconnectivity or absence of interconnectivity of two or more data streams, which in turn will lead to false positives or negatives as to whether a system is operating normally or abnormally. Further, the prior art methods and methodologies focus on specific industries or technologies or limit themselves to unique data sets that can be drawn out of specific systems. Without describing a general tool that can be adapted to integrated parameter systems regardless of the industry or technology in which those systems are implemented.

Other prior art methods and methodologies describe network monitoring techniques that are designed to give an operator a clearer picture of the functions and operations of a sophisticated integrated data network without flagging the normal or abnormal operations themselves, thus presumably allowing the operator to flag problems or anomalies as they occur. US patent Publication 2012/0278015, for example, discloses a real-time performance monitoring system for an electrical grid. This system monitors and stores a plurality of metrics in a unique database that an operator may access. The operator has an option to display various aspects of those metrics in graphic form for easier system monitoring. Regardless of how clear the picture may be, this method is particularly susceptible to an administrator's judgment and biases as he or she makes the final determination of normal or abnormal operation.

These prior art systems are invariably rigid in their selection and application of data that will be monitored, in their development of mathematical models to mirror the integrated parameter systems across which their methodologies will be applied, or in their techniques for flagging anomalies or variances within normal system operation. A need therefore exists for a more objective method and methodology for monitoring an integrated data network such that the user can direct the method and methodology with respect to the data that will be monitored and the tolerances that will be accepted before variances in data streams are flagged as being anomalies.

A need further exists for a method, methodology and apparatus that can be adapted across any form of integrated data network or system and that can be configured in the most optimal user-friendly manner to detect anomalies in the operation of that network or system. The method and methodology should be able to rely upon all historical and real-time data generated by that network or system to define a normal pattern of operations, with regular real-time updates, regardless of the correlation or inter-relationships between selected data streams. Other needs and desired features are as described in the specification.

SUMMARY OF THE INVENTION

In one preferred embodiment of the invention claimed herein, a technology framework and an algorithm are disclosed for use in monitoring an integrated data network or system and for flagging anomalies within that network or system. The technology framework comprises real-time signal monitoring, anomaly detection and alarm management. The algorithm characterizes integrated data networks and systems through classification by varying degrees of the inter-relationships and correlations between two or more measured parameters.

In another preferred embodiment of this invention, a combined hardware platform and software system and apparatus is disclosed, wherein such system and apparatus may be adapted to monitor virtually any integrated data network to flag anomalies that may occur within that network. This system and apparatus is configurable by an end user, who may select specific data signals to monitor within the integrated data network as well as other operational parameters. The system and apparatus includes reporting mechanisms that allow the user to graphically display any number of operational parameters and, when anomalies are detected, other reporting mechanisms will display those anomalies and will further allow the user to examine and review those anomalies in greater detail.

In still another preferred embodiment of this invention, a sophisticated information theory analysis is applied across multiple data subsets, which subsets are generated by multiple components with in an integrated data networks, which analysis includes a combination of multi-dimensional mutual information theory and conditional entropy, plus application of locality-sensitive hashing via has functions to reduce or minimize the volume of data components that require analysis. This system and methodology increases the precision of detection of normal and abnormal network operations, while increasing the speed at which an abnormality may be detected.

Each of the foregoing embodiments, as well as other technical aspects of the present method and methodology, may be implemented either directly through dedicated data analysis and output devices, or in the alternative, these embodiments may be implemented through an internet web-based interface that is hosted on a dedicated server or through "cloud" based hosting services. Further, the foregoing embodiments can be configured and customized to feed output of the data analysis directly into an end user's information system and network in a form and format specified by the end user.

The technical, scientific, and other terminology in the present specification are utilized according to their common meanings with their respective industries and as known and utilized by persons skilled in the arts described herein. Nothing in the specification for this invention is intended to, and accordingly no aspects of this specification should be interpreted as a limitation on the present invention. Rather, this specification describes one or more preferred embodiments of the invention as illustrations of the principal aspects of the invention. Persons skilled in the arts described herein will understand the full breadth and scope of this invention, including its many permutations and practical embodiments.

In addition, the implementation and utilization of the method and methodology described in this specification will require combinations of manual and automatic processes, including data input and analyses by an integrated processor, processing and storage of outputs in an associated memory, depictions of graphical representations of the various outputs and updating of libraries and databases and memory as additional data is acquired and processed in the hardware platform. The present invention is not limited to one particular manner or mode of such processes, nor is it unique to any specific hardware or software platform, operating system, or any combination of such systems and platforms.

Furthermore, the historical databases described in the present invention may be built or constructed upon any of the common and commercially-available data library software platforms, such as Oracle. The person skilled in the art may also be able to mix and match various data library systems with other operating systems to implement the present invention.

BRIEF DESCRIPTION OF THE DRAWINGS

FIG. 2 is a graphical example of a density function from the operations of a typical plant or facility.

FIG. 9 is a flowchart depicting how features or data points may be ranked with a mutual information analytical method.

DETAILED DESCRIPTION

Figure 1A:
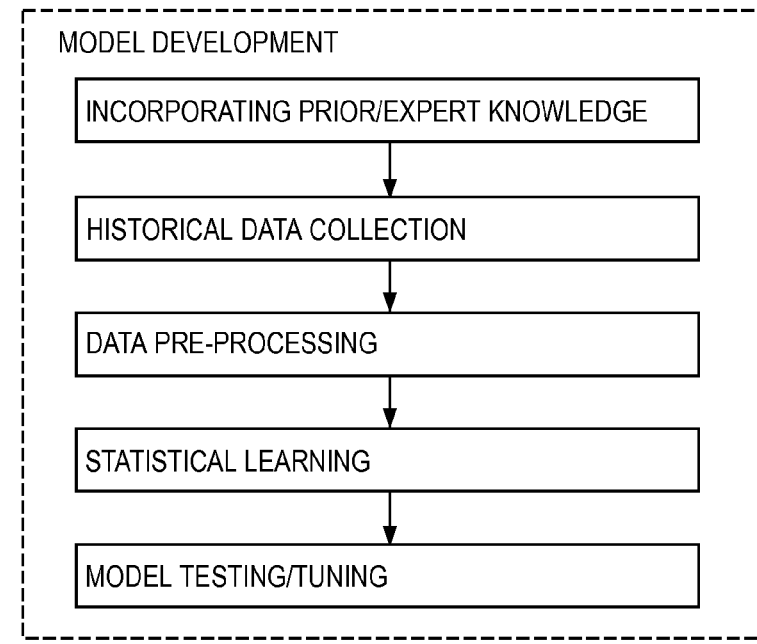
FIGS. 1A, and 1B are flowcharts depicting how a mathematical model for an integrated data network will typically be respectively developed and deployed.

The embodiments of the invention described in this specification refer to a method, methodology and apparatus that can be used with any integrated data parameter network to monitor the performance of that network and to flag anomalies that occur within various data streams or across the network in general. In general, an integrated data parameter network is any multi-component system that includes a plurality of distinct nodes, each of which may generate its own data stream. The data streams from the various nodes may be interdependent or correlated, or they may be independent of each other. Examples of common integrated data parameter networks include, for example, a wind turbine farm in which each individual turbine generates electrical power as a function of ambient wind load; a fluid pumping system comprised of a plurality of pumps, switches, flow meters, and other corollary units such as heat exchangers or aerators; and wide-area electronic data networks that collect and analyze data from multiple sources and generate output for analysis by end users. By way of further examples, the latter-described electronic data networks include stock exchange trading floor systems, payment processing and flow systems like those that are implemented by debit and credit card processing entities, and medical record software systems that collect and record medical data inputs from various service providers. As noted, the method, methodology and apparatus of the present invention is not limited to any one type or classification of an integrated data parameter network, but it may be incorporated into and utilized with virtually any such network.

One characteristic that is common to all integrated data parameter networks is the susceptibility of the overall network to fail or to operate at less than optimal performance due to anomalies that occur within the network. Consider, for example, a wind turbine farm comprised of fifty one-megawatt horizontal-axis turbines, each of which is expected to operate at forty percent capacity. At this capacity each individual turbine would produce about three million kilowatts of energy per year, and the overall wind farm would be expected to produce one hundred fifty million kilowatts annually in the aggregate. The wind farm operator would configure an integrated data parameter network for this farm consisting of a plurality of wind speed measurement tools, power output meters for each turbine and performance meters for transformers and power storage devices associated with the turbines. The operator would then configure a data collection system to collect and record data from each of the individual data-generating nodes, which then create a historical database of the network's operations.

In complex multi-variable systems comprising variable criticality subsystems, such as this hypothetical wind turbine farm, identifying and segregating normal and abnormal states will allow an operator or administrator to address abnormalities and to avoid unnecessary shutdowns. As with all complex systems, the ultimate goal is to use the historical database to create a mathematical model of normal operations and to continue to refine that model to eliminate operator and other biases.

The daily power output for this hypothetical wind farm would not be consistent but would vary as a function of wind speed and several other parameters. Regardless, over time the wind farm operator would develop a baseline data curves reflecting normal or expected operation of the wind farm under various sets of ambient conditions The baseline data curve maps the data signals from individual data-generating nodes in the network to provide a graphical depiction of the typical operation of the network. The operator can configure the data collection system to view any number or all of the data parameter streams, yet merely viewing that data will not alert the operator to anomalies in the system or any data stream, nor provide any clues as to how to distinguish normal variances within data streams from anomalies. Further, manual observation of the multiple data-generating nodes virtually impossible because of the aggregate volume of data generated by a single integrated data network. These networks are therefore uniquely amenable to automated monitoring systems implemented over computer information systems. The challenge faced by the network's operator or administrator is to teach the computer information system to recognize whether a particular condition represents normal or abnormal operating behavior.

The operator's first inclination may be to directly correlate system variances with measurable variances in ambient conditions. For the wind farm, for example, the operator may see increases and decreases in power outputs and correlate those with measured wind speeds. Prior art systems that are designed to flag abnormal variances or anomalies in integrated parameter data networks generally rely upon an operator's ability to identify and select data streams that are correlated or interrelated, such as wind speed and power output in this example. As noted, complex integrated data parameter networks frequently generate billions of data points from hundreds or thousands of individual nodes. With this volume of data, an operator is likely to miss or misclassify relationships between various data streams. Reduced power outages in the wind farm, for example, may be the result of a malfunctioning transformer or other factors that the operator may overlook. In the alternative, the operator may assume relationships between or among various data streams where no true correlation exists. Prior art anomaly detection systems that rely on simple direct correlations are similarly prone to these types of errors.

Figure 1B:
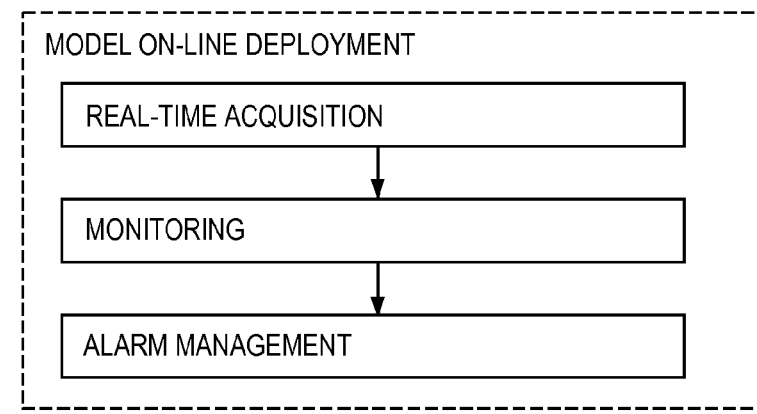

FIG. 1A is an overall process flowchart depicting how a model for an integrated parameter data network can be developed in a series of sequential steps. This flowchart is common to all model development systems. The developer begins with his or her own prior and expert knowledge of the network. Historical data generated within the network is then collected and the data is pre-processed to give the developer a snapshot of the network. The developer will then apply a variety of statistical techniques to validate the data and the model that has been created, after which the model will be tested and fine-tuned. Then, as shown in the flowchart depicted in FIG. 1B, the model will be deployed. Deployment generally includes the further sequential steps of acquiring additional data in real time as the network continues to generate data, monitoring the network to determine if it is operating within a normal operating range as predicted by the model, and managing and understanding alarms which the model generates when it detects an operating state that is outside of the normal operating state that is predicted by the model.

Figure 1C:
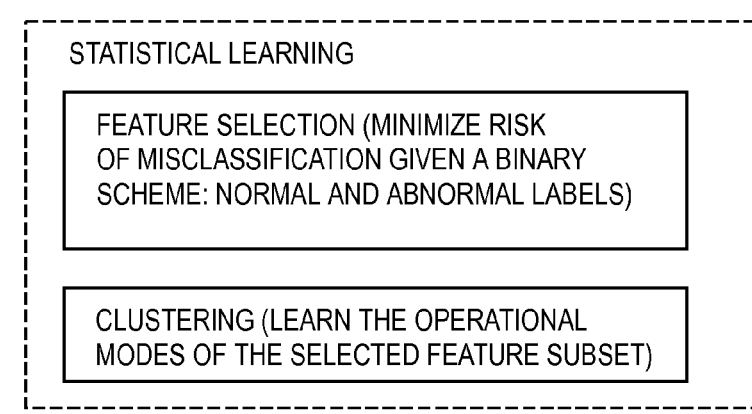
FIG. 1C is a flowchart showing in greater detail how the process of statistical learning is incorporated into this invention.

The present invention follows the model development flowchart shown in FIG. 1A first by encoding the historical data collected and stored from the nodes and data streams generated by the network and then by mapping that data within a finite space that represents normal operating states of the network. This step is the data pre-processing step of the flowchart in FIG. 1A. Everything within the mapped space reflects normal operations, and everything outside of the space represents abnormal operations. This is not a one-time process within the method and methodology, but consistent with the statistical learning step of the flowchart, it is iterative. FIG. 1C depicts, in greater detail, the processes involved in statistical learning with this invention, which processes combine feature selection and clustering. Proper feature selection minimizes the risk of misclassification given a binary scheme of assigning a state into a normal or abnormal category, and clustering teaches the model to recognize operational modes of selected features of a network within particular feature subsets. As more data is collected and stored, the method and methodology of this invention refines the mathematical model to reflect the new data which, if it represents normal operations, will be added to the encoded data space that is the mapped historical data.

Figure 3:
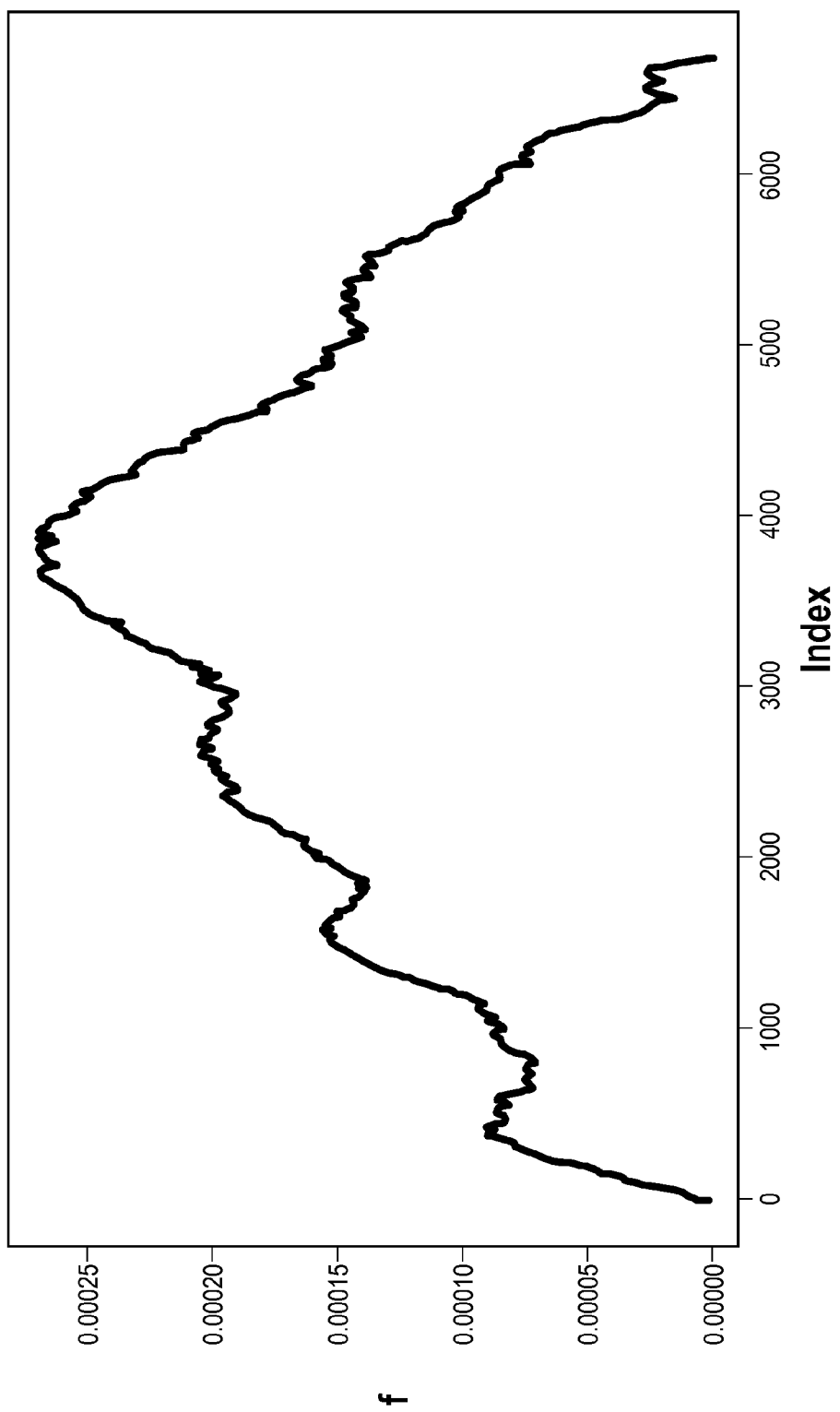
FIG. 3 is another graphical example of a density function from the operations of a typical plant or facility.
Figure 4:
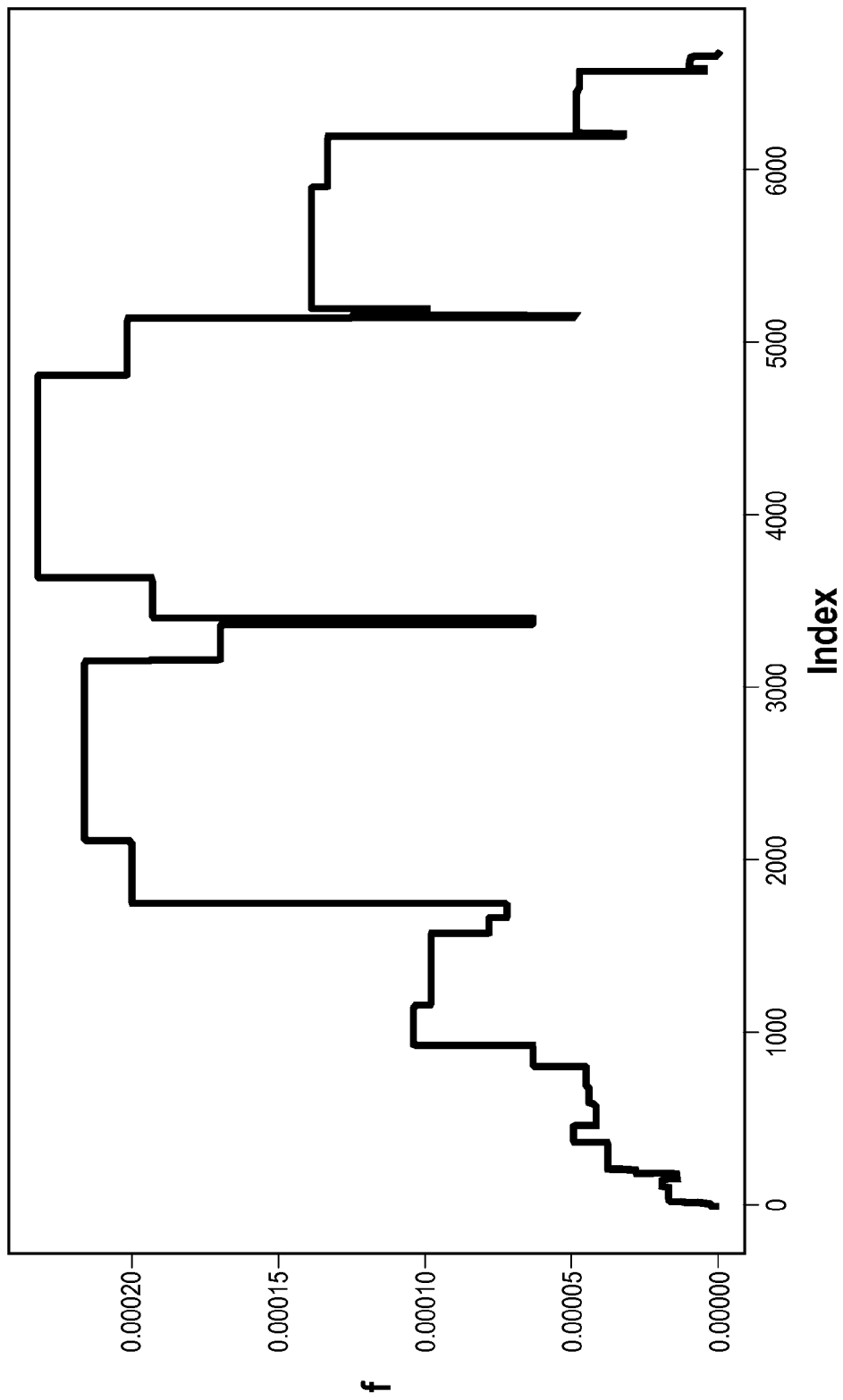
FIG. 4 is yet another graphical example of a density function from the operations of a typical plant or facility.
Figure 5:
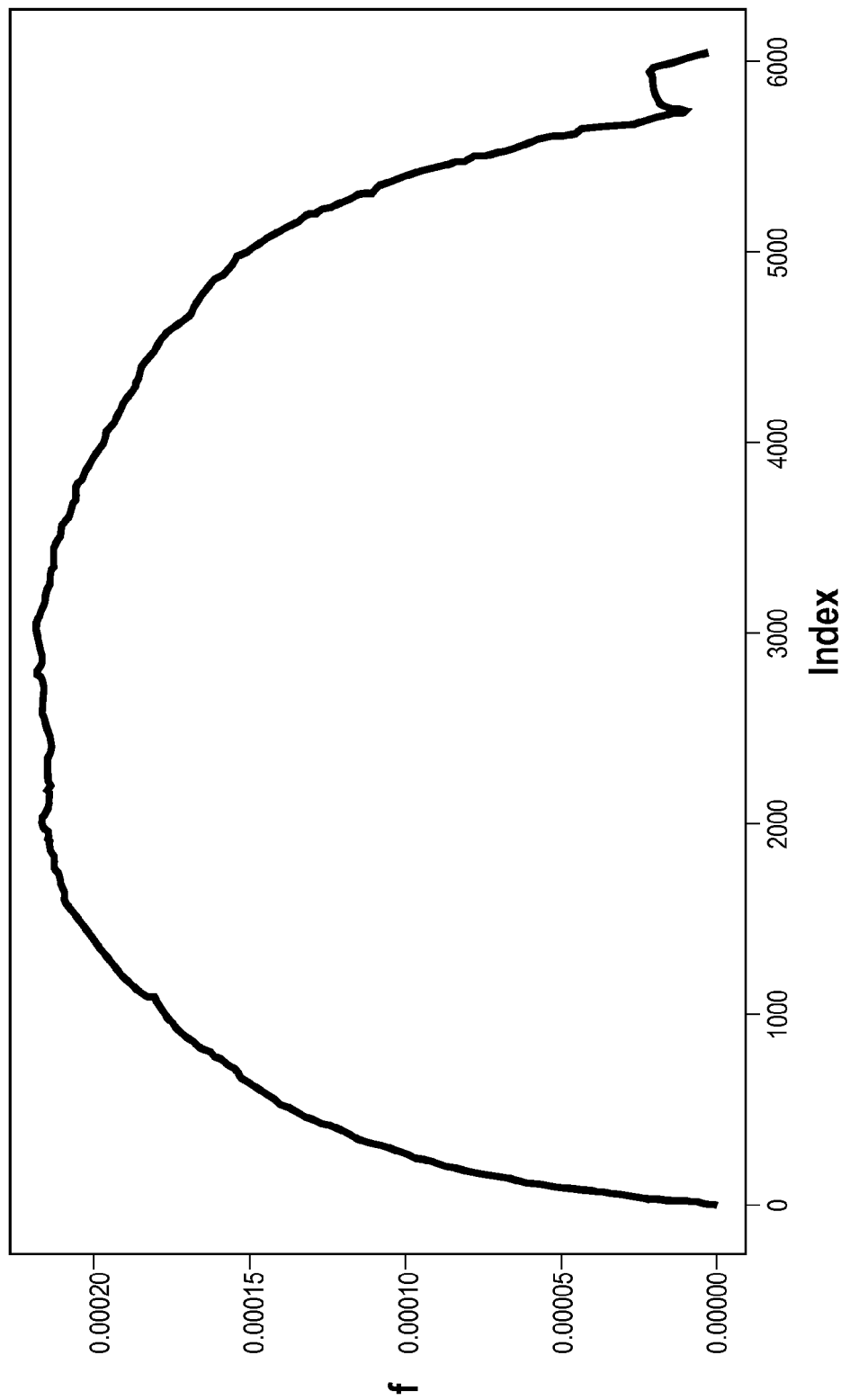
FIG. 5 is still another graphical example of a density function from the operations of a typical plant or facility.

A collection of data will generally reflect densities or clusters of data around certain values. FIGS. 2 through 5 depict various representative density functions that can be derived or estimated from standard operations of most types of data-generating networks. FIG. 2, for example, shows a denser area of data readings between X-Axis index values of 2000 and 4000. FIG. 3 depicts a less dense data regime, and FIG. 4 depicts a more stepped data pattern that reflects quantum transitions from one data point to the next. In each of FIGS. 3 and 4, notwithstanding the obvious graphical differences, areas of higher data density are readily identified. FIG. 5 shows a broader spread of data from the operations that are graphically depicted on that graph, yet again, regions of higher density are identifiable in this Figure.

Density estimation and depiction techniques are important in any technology that attempts to model the normal operations of a data network and to segregate normal from abnormal operations. The technology trains itself to recognize normal patterns and to depict a descriptive graphical representation of properties of a system's various operational modes. The system and methodology of this invention combines data density recognition and locality sensitive hashing (LSH) to create a model of normal operations of an integrated data network. This combination is shown in the direct relation between the function defining density and the algorithm defining data clusters; specifically, data clusters are the maxima of the density function:

$$f^D(x) = \frac{1}{nh}\sum_{i=1}^{n} K\left(\frac{x-x_i}{h}\right)$$

The data clusters so defined will be above a defined level of noise that might otherwise introduce errors into the determination of whether a system is operating normally or abnormally.

The selection of data, variables and other criteria to include in the mapped data space may introduce errors into the ultimate mathematical model that is created to represent normal operations of the integrated data network. The present invention avoids these errors by first orienting the data selection process to the model's purpose, and then optimizing a selected set of variables and criteria to determine a precise classification of normal and abnormal events. A weakness of mathematical models of complex multi-variable systems is the inaccurate or biased determination of what constitutes normal operation of the system as opposed to abnormal operation. This invention provides a new approach in that it bases the model on the operator's preferences about the risk of misclassification between normal and abnormal. If an operator is willing to accept greater risks of misclassification, he or she will utilize a more expansive boundary around the confidence interval defining the normal behavior. This may create an event in or around a boundary that is undecidable—neither normal nor abnormal. In the method and methodology of this invention, these undecidable events will be deemed to be abnormal until model is able to classify this deviation as normal or abnormal.

The system and methodology of this invention presents a novel approach to misclassification risk by linking mutual information and permutation tests to find the most optimal relation between selection of the model for the integrated data network and the probability of reaching a false negative, which, in statistics theory, is known a type II error. The significance levels that are derived from total residual entropy and mutual information are used to optimize the feature selection process within the constraints imposed by model selection. In prior art systems, the creator of the model typically does not exploit the interdependence among various data streams.

The information theoretic approach of the present invention, namely, its ability to precisely identify the underlying interdependence structure in the data, will preclude incorrect classification of events as normal or abnormal. Further with this methodology, the complement of the probability of making a type II error (i.e. the probability of not reaching a false negative) is greater was than the probability of rejecting a true null hypothesis, or type I error given a dominating alternative hypothesis. This probability, or "p-value" is defined in the present invention as follows:

$$p = \frac{\left|\{D' \in \breve{D} : e(f, D') \le e(f, D)\}\right| + 1}{k+1}$$

$$p = \frac{\left|\{D' \in \grave{D} : e(f, D') \le e(f, D)\}\right| + 1}{k+1}$$

$$p = \frac{\left|\{D' \in \hat{D} : e(f, D') \le e(f, D)\}\right| + 1}{k+1}$$

$$p = \frac{\left|\{D' \in \hat{D} : e(f, D') \le e(f, D)\}\right| + 1}{k+1}$$

$$p = \frac{\left|\{D' \in \hat{D} : e(f, D') \le e(f, D)\}\right| + 1}{k+1}$$

where $\hat{D}$ is a set of k randomized versions D' of the original data D from the null set and f is the classifier.

Some prior art systems approach this phase of construction of the model in an analogous manner, yet with one significant downside. Complex integrated data systems may generate hundreds of subsets of the overall model, each of which subsets represents a new set of operating conditions. When new data is generated, prior art systems will search through every subset to determine where the new data fits, if it does fit anywhere at all within the subsets. This can be a slow and cumbersome process that defeats the utility of the model, particularly if an operator or administrator is relying in the model to rapidly detect abnormal operating conditions. The system and methodology of the present invention avoids this slow search problem by utilizing mutual information theory to analyze relationships between and among data sets as data is collected. This reduces the number of data records that need to be searched as new data is generated and significantly improves the search process.

The mutual information of two or more random variables is a quantity that measures the mutual dependence of those variables. The system and methodology of this invention allows the operator or administrator to select variables among the streams of data generated by the network, then calculates the mutual information for those variables, The operator or administrator may designate as many variable pairs and groups as may be desired, and the system and methodology will then determine if those variable pairs or groupings reflect variables that objectively affect each other. Variables that have no relationship are segregated out of the search function as new data is introduced and measured against the mathematical model, thus facilitating a faster search and a quicker determination of whether the new data reflects normal or abnormal operations of the integrated data network.

Developers of methodologies for the detection of anomalous behaviors in multi-variable systems strive to achieve high quality separation of the operational modes that characterize a normal system behavior on one side and the operational disturbances that point to a developing anomalous event on another. Mutual information analysis facilitates this separation more effectively than any of the prior art systems and methodologies that have been developed for this purpose. The classification of a variable into normal or abnormal operating space includes dimensionality reduction which, in a preferred embodiment of the present invention, is implemented as a sequential subset selection algorithm that optimizes the conditional mutual information or the generalized mutual information among the selected features.

The dimensionality reduction that is accomplished by the methodology of the present invention is more readily understood by comparing it to the prior art methodology, including that which is described in U.S. Pat. No. 7,394,746. The prior art primarily utilizes two approaches to dimensionality reduction: feature transformation and subset selection. Feature transformation is a process through which a new set of features is created. In subset selection no new features are generated but only a subset of the original features is selected and the feature space is reduced. Subset selection leads to reduced storage and training time. The method and methodology of the present invention utilizes a custom subset selection technique, which is designed to enhance the predictive power of the model in several directions.

As an example, consider that the operation of modern industrial equipment exhibits complex nonlinear relationships for which important information can be lost after linearization of the operation within a mathematical model. The method and methodology of this invention retains the information that would otherwise be lost in this process through information-theoretic subset selection. The method and methodology of this invention is therefore not limited to only linear dependencies, as would be much of the prior art. Much of the prior art assumes that correlations between variables will be linear in nature, i.e. when variable A increases, variable B will increase or decrease proportionately. This assumption of linearity is common in many anomaly detection techniques that are utilized in multi-variable systems. The system and methodology of the present invention described in this specification overcomes these limitations.

The method and methodology of the present invention uses generalized mutual information or conditional mutual information as criteria for selecting the relevant variables and criteria for inclusion in a model, giving it a clear advantage in discovering the underlying meaning of the data in greater depth. As noted herein, analyzing data pairs and data groupings via a mutual information analysis, which provides an objective measure of the true relationship between and among those variables. Prior art anomaly detection techniques that consider only relationships between variable pairs that are selected or defined by an operator or administrator will result in systems that have an increased likelihood of incorrect classification of a state as normal or abnormal because the selection of those variable pairs has an increased propensity to reflect operator or administrator biases. The present invention incorporates measurements of shared information among groupings of more than two variables and it therefore expands and improves on the prior art by virtue of examining the interactions among a number of interrelated variables. This increases the operator's flexibility and opportunity to investigate a variable information level in terms of a minimum of shared information, which can be different for each feature added. Prior art systems generally include no objective investigations of variable relationships and rely instead on an operator's selection of variables and variable relationships without confirming whether any relationship exists therein.

In practice, the technique described in this specification leads to enhanced sophistication in subset selection, which significantly improves the statistical learning of the operational modes of the equipment and enhances the predictive power of the method and methodology. Prior art techniques that have access to only pairwise relationships will incorporate high distortion level in the interrelation properties of paired variables, which results in over-compensation and possible over-filtering of any noise in the system. Yet another advantage of the subset selection technique of the present invention is that it preserves only the relevant features of a component and allows for the definition of operational modes using those original features. Other prior art techniques that utilize transformation methods will change the original features. The system and methodology of the present invention includes no such transformations but instead utilizes actual data and an objective measurement of whether relationships within or among data pairs and groups.

Another way to understand this is to consider that the invention described in this specification utilizes mutual information theory to select subsets or features of complex integrated data networks as a mechanism for controlling the risk that errors or biases will be introduced in that selection process. Mutual information theory will target clusters of data points that represent a normal operating mode of the network, which in turn allows for more precise classification of that mode. Adding more variables to the model may introduce high variance noise that does not reflect true correlation between the variables, but mutual information theory will allow a more precise determination of whether a correlation exists. As the model develops with the addition of more variables and more data points over time, an operator may see large gaps between prior data points and new data points. This may reflect overlapping regions between previously-identified normal and abnormal operating states, which suggests that the model has uncertainties resulting from spaces that were unexplored or unmapped within the mutual information analysis.

The question this presents is therefore whether the new data which shows these large gaps reflect normal or abnormal operations. The probability for misclassification in this situation is relatively high. The prior art answers this question by analyzing how data is classified and then simply hoping that the misclassification risk is small. By contrast, this invention asks the operator to specify a maximum misclassification probability (e.g. 5%) as a function of the criticality of a particular component in a data network. This invention then applies mutual information theory to select features of the network to optimize the remaining classification probability (e.g. 95%). General mutual information theory will facilitate this by sharing selected data streams or signals to the selected misclassification risk via the entropy of the previously-identified normal operating state. For any selected error probability level, this invention selects features which achieve the specified level to eliminate uncertainties in separating normal from abnormal operating states.

As noted, another valuable feature of this system and methodology is that it allows development of a mathematical model that reflects non-linear relationships not only between a pair of data streams, but also among as many variables as an operator may desire to consider. In a data triplets represented as data streams A, B, and C, for example, it is possible that a variation in data stream A will not affect data stream C unless data stream B also varies. Mutual information analysis will test these multi-variable data relationships to confirm the existence of a relationship.

In its more detailed embodiments, the method and methodology of this invention can be configured to consider the distinction among three data levels at which sets of parameters will be analyzed to arrive at some operational consistency. The first level is the organization of measurements by equipment groups. In practice, equipment groups are identified by engineering analysis of an underlying process. The method and methodology of this invention significantly reduces the time needed for this identification by selecting such groups according to their respective end points in the process flow. The operator will first select the significant parameters for a group and the method that will be used to relate the parameters, namely, either a pairwise or multidimensional interaction.

Figure 6:
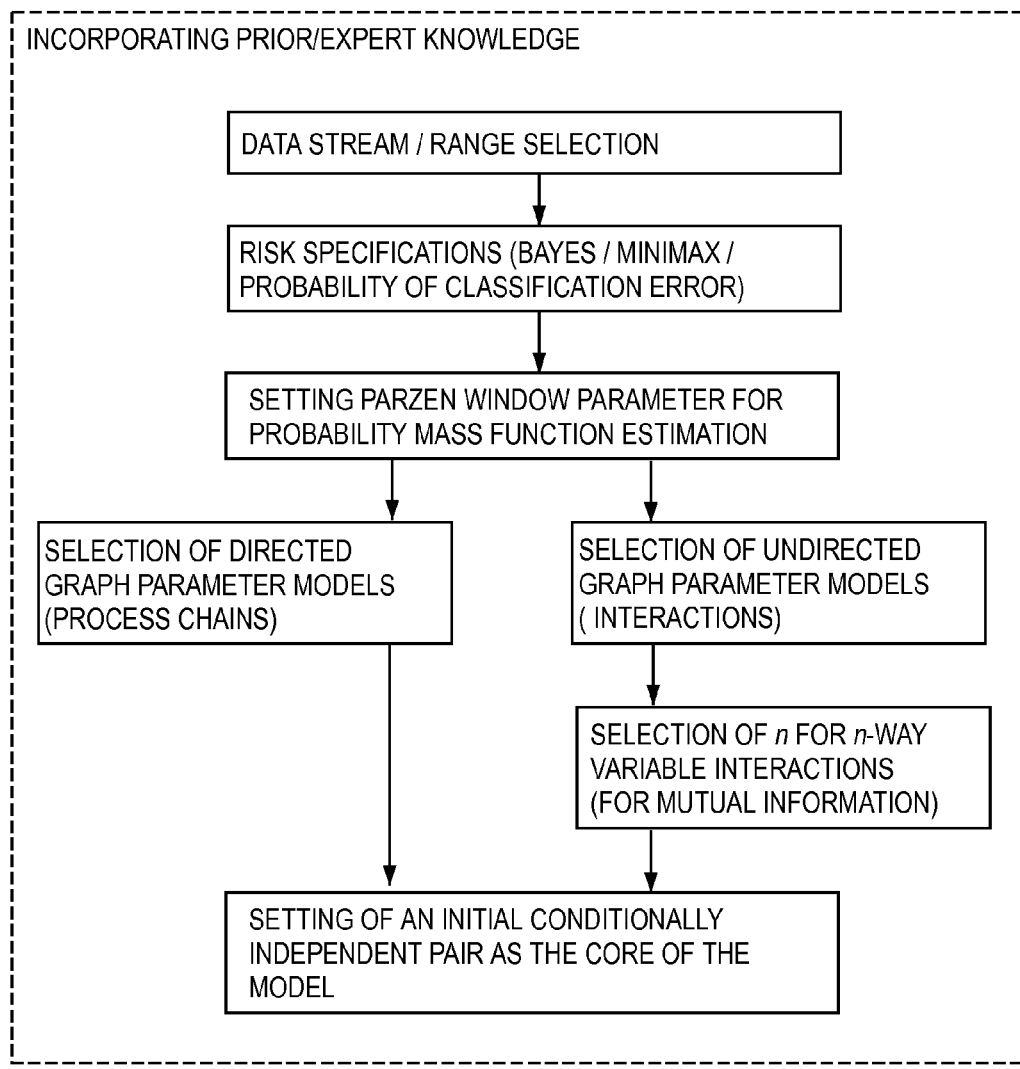
FIG. 6 is a flowchart depicting the logic that is typically utilized in incorporating an operator's prior or expert knowledge in to the development of a mathematical model of an integrated data network.

As depicted in the flowchart shown in FIG. 1A, an operator who is building the mathematical model for a complex system will inevitably incorporate his or her own expert and prior knowledge of the network into the model. FIG. 6 shows a flowchart for how an operator might accomplish this step within the confines of the present invention. First, the operator will select a particular data stream and a range of data generated within that stream. The operator will then specify the level of risk of misclassification for those data points using standard error classification methods, such as a Bayes or Minimax probability, and will determine the probability density of the variable range using a Parzen window analysis. The operator can then establish directed and undirected graph parameters, and for undirected parameters he or she can select the magnitude n of variable interactions that will be analyzed within the model. This methodology thus allows the operator to utilize prior and expert knowledge to establish initial conditions for the network's operations.

The operator continues to build the model by next specifying the minimum shared information that will be required to link certain parameters and, for the multidimensional interactions, the maximum differential for the decreasing mutual information. The operator can regulate the precision of the selection process by adjusting the probability density functions of variables (also known as the "Parzen-Rosenblatt window") for the distributions, the size of the starting parameters, and the minimum expected shared information among the parameters.

The second level of analysis involves selecting parameters from the identified equipment group such that the error margin based on conditional entropy in predicting an anomalous behavior within the group is minimized. The operator has the same level of control over the selection process.

The third level of analysis occurs when the most optimal (in terms of mutual relevance) set of parameters is selected. This level is a classification process that classifies parameters according to specified level of consistency and accuracy in prediction, but their core sequence does not share the same amount of information as the first set which is the most optimal selection.

The development of the mathematical model at this phase also includes a determination and analysis of the interrelationships and correlations of the various data streams within the network. As noted, these interrelationships and correlations are either frequently missed or are falsely assumed to exist due to human error. In a preferred embodiment, the method and methodology of the present invention includes a further mechanism for analyzing and tracking causal data relationships, specifically by combining normalized conditional entropy and generalized mutual information theory. Mutual information as a measure of dependence between random variables has two important advantages within the context of this method and methodology. First, mutual information can be used to measure the dependence of nonlinear relationships besides linear ones. Second, mutual information is a nonparametric estimation method, and specifically it is not limited to any family of functions. Refining the analysis with normalized conditional entropy provides the operator with an objective measure of the uncertainty that may be inherent within those relationships. As a result, the hybrid analysis poses a lower risk that the data may not fit the specified family well. This is best understood via an example.

In the multiple wind turbine example described herein, the operation of single turbine may be modeled by a combination of data components, including vibration and thermal components. These components may or may not be related. Based on observations, an individual who assesses the turbine's operation may conclude, for example, that the turbine's operating temperature and vibration parameters will change in lockstep, and that they are therefore related. This may be a false conclusion, however, as the vibration may be more closely correlated with other components that may change as the turbine's operating temperature changes. The present system and methodology allows the operator to examine all of the data being generated and measured from individual components within the total system and, via mutual information theory, to determine the probability distributions between pairs and groupings of variables to determine which have the highest correlation. Once these core pairs and groupings of variables are determined, the system next examines other variables that may reflect the core pairs and groupings.

While different combinations of the described machine learning techniques can be applied towards model selection, the preferred and unique combination defining the subset selection method of the present invention is described as follows. Initially, consider that the selection procedure reflects the structure of a forward sequential search. This search first estimates the marginal and joint probability mass functions (using the Parzen-Rosenblatt window method) for pairs of variables and then ranks these pairs with 'N' being the size of the set of all input variables. The process chooses two pairs based on their mutual information value, which the operator will set at a level that is higher or equal to a specific threshold. This completes the pair-wise feature ranking that identifies the strongest candidates for core subsystem variables. For optimal precision and performance, the system continues the model selection process from the highest ranked pairs by adding other variables that satisfy a specific multidimensional mutual information value. Thus the most optimal subsets of variables are identified in order of statistical significance. This completes the sequence that constitutes the core of the model. Then the system continues to add new variables which, this time, for improved performance, are only ranked against the core variable sequence. When the true multidimensional depth and nonlinear structure of the dependency are determined, the method and methodology of this invention identifies the features that communicate in the most consistent manner within the core of the model. Grouping variables in this manner allows for greater precision in the mathematical model that ultimately reflects the system which includes this turbine.

This process is repeated over a span of time to confirm the correlation between the core variable pairs and groupings. In one embodiment of this invention, the user can adjust the sensitivity of the pairings and groupings to facilitate tighter or looser correlations. Alternately, the methodology of the present invention can infer a threshold correlation coefficient from the total historical database, which coefficient reflects the normal operating state of the total system.

Figure 7A:
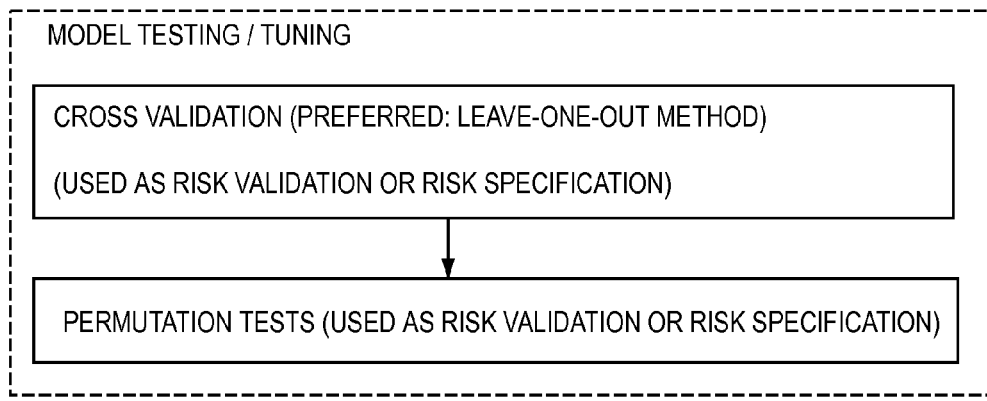
FIGS. 7A and 7B are flowcharts depicting how mathematical models such as the one described I this invention are tested, tuned, and monitored.
Figure 7B:
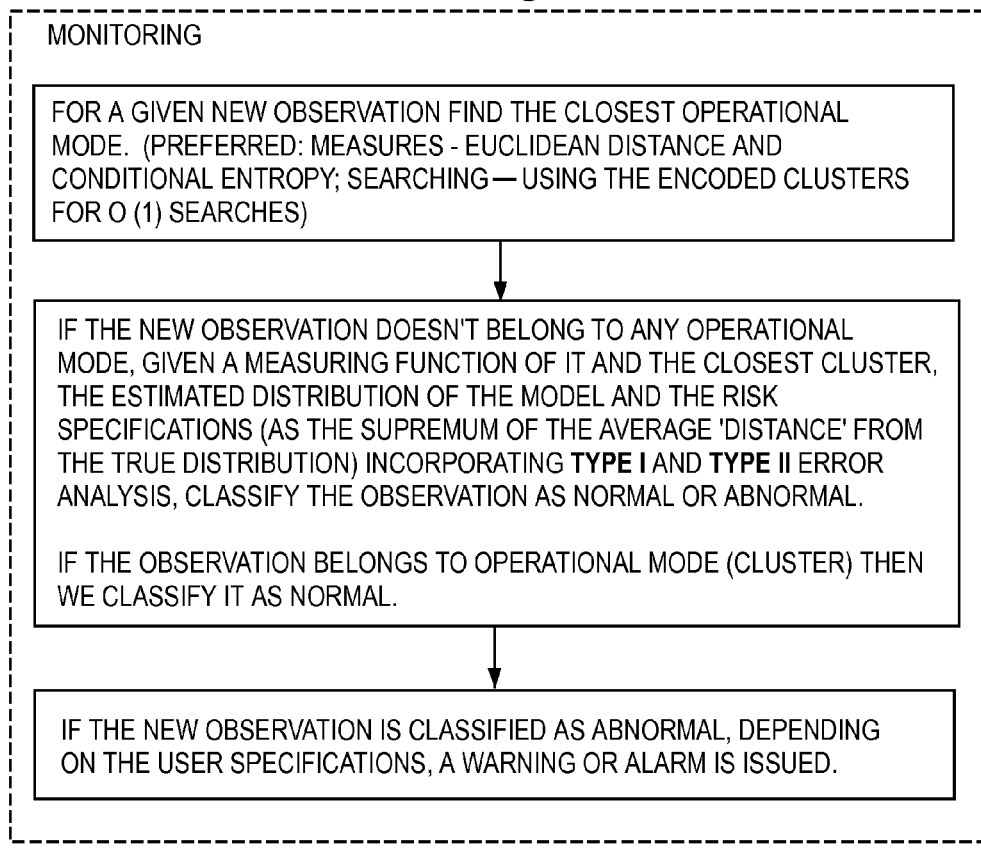

The model selection process is further controlled by testing and tuning the model and monitoring the network, which influences not only the consistency of the resulting model but also the sensitivity and performance of the selection process itself. FIGS. 7A and 7B depict flowcharts showing how the model might be tested and tuned, and how the network might be monitored when the model is applied. Testing and tuning can be accomplished, for example, by cross validation techniques in which one variable or method is eliminated to assess the effect on the model of that elimination. Standard statistical permutation tests may also be used to test and tune the model. The framework of this invention provides the possibility for setting the parameters of the estimators of the probability distributions for different sensitivity scenarios. In an alternative embodiment, the length of the core sequences can be changed, which changes the performance characteristics of the classification. Still another alternative embodiment regulates two thresholds for the mutual information, one that defines the consistency level of the core sequence of variables and another one which does the same for the ranked against that sequence variables.

The mathematical model of the overall system will be based on the system's historical data and will provide a picture of the system's normal state utilizing entropy measurements. As noted, in information theory, entropy is a measure of the uncertainty in a random variable. In the context of this method and methodology, this random variable is a data point or parameter. Entropy quantifies the expected value of information contained in a message or data stream. By analyzing historical data, the mathematical model incorporates information theory to improve the quality of the derived operational states so the identification of the difference between normal and abnormal behavior is maximized. Thus, the framework can accurately predict a developing anomaly using the values of a data point and parameters coming out of any particular node in the system at a certain point in time. In one embodiment of this invention, much as the operator or user can adjust the required amount of shared information for pairs of variables, the operator can also adjust the entropy rate that is incorporated into the model to regulate the contribution requirement for single variables to the overall quality of the model. FIG. 7B depicts a sequential flowchart, showing how the operator will monitor the model as additional data is generated within the network. For example, for each new data point or observation, the system will determine the closest operating mode that is consistent with that observation. If the model is unable to find a close operating mode, it will classify the observation as normal or abnormal and, if abnormal, it will alert the operator to an abnormal operating condition.

Another factor that distinguishes the system and methodology of this invention is that it facilitates the identification of interrelationships and causal chains among not just pairs of data but also among multiple data streams. In pertinent part, the method and methodology of this invention relies upon conditional entropy concepts to accomplish this. Conditional entropy quantifies the amount of information required to describe the outcome of one random variable given the value of another random variable. In the wind farm example, an operator may conclude that the power output of a single wind turbine can be predicted with wind speed alone. The method and methodology of this invention would add a conditional mutual information chaining analysis by looking at non-overlapping mutual information-rated correlations between power output and ambient temperature, precipitation, time of day, internal alternator temperatures, and a host of other data streams that might not be considered by the human operator, who would not have the capacity to analyze the extreme volume of data and all possible data interrelationships and correlations within the integrated data parameter network. Each of those data streams would be analyzed to determine whether they are relevant in a verifiable and appropriate manner to the power output. The method and methodology of this invention automates the process with robust information system technology, and it also eliminates false or generalized conclusions that an operator may make as to the interrelationships between two or more data streams.

The next step in the development of the mathematical model for an integrated data system is the generation of a picture of the system's normal state, including groups of data streams and information within the system that are interrelated or that correlate with each other. Data streams and observations of data, as well as interrelationships and correlations among data, are not all equally valid, the mathematical model creates these groupings along probabilistic paths based on measures of generalized mutual information and conditional entropy. Assigning probabilistic connections among various data streams further distinguishes the method and methodology of this invention from the prior art, which generally accords equal treatment to all data and connections among data.

An ideal mathematical model will identify related features in two modes. In the first mode the model constructs a chain of data streams, via mutual information analysis, based on causal relationships where the amount of shared information criterion should be satisfied only between two adjacent nodes in the chain. In this way the model is able to identify threads of related components in a complex multi-variable system. Also the model allows the user to select a component and identifies the chain this particular component belongs to. In the second mode the model identifies an interrelated system of components where a certain quantity of information has to be shared by all data streams in the identified group.

In complex integrated data networks that include multiple individual components, each of which may generate multiple streams of data, those components may not need to share the same amounts or classifications of data during normal operations. For example, one component may generate data that directly affects a second component, but that also only peripherally affects a downstream component, if it has any effect at all. An operator who attempts to model a complex system may err on the side of assuming data interactions where none exist, or by ignoring interactions that are within an attenuated chain. The invention described in this specification applies a chain feature selection technique to identify these attenuated interactions.

A chain of "n" components within an integrated data network may be classified as a stream on integers 1, 2, 3, ... n. Assume two distinct components in that chain are either not well-related to each other or to any components in the middle of the chain in terms of their respective interactions. The algorithm described in this specification identifies each component's contribution to the process or processes created by the component chain in order to determine whether to include those data interactions in the model. Individual selected features may not be individually relevant to each other or to the model itself, but they may be relevant within the framework of selecting the correct data streams for proper classification of normal or abnormal operating states.

Figure 8:
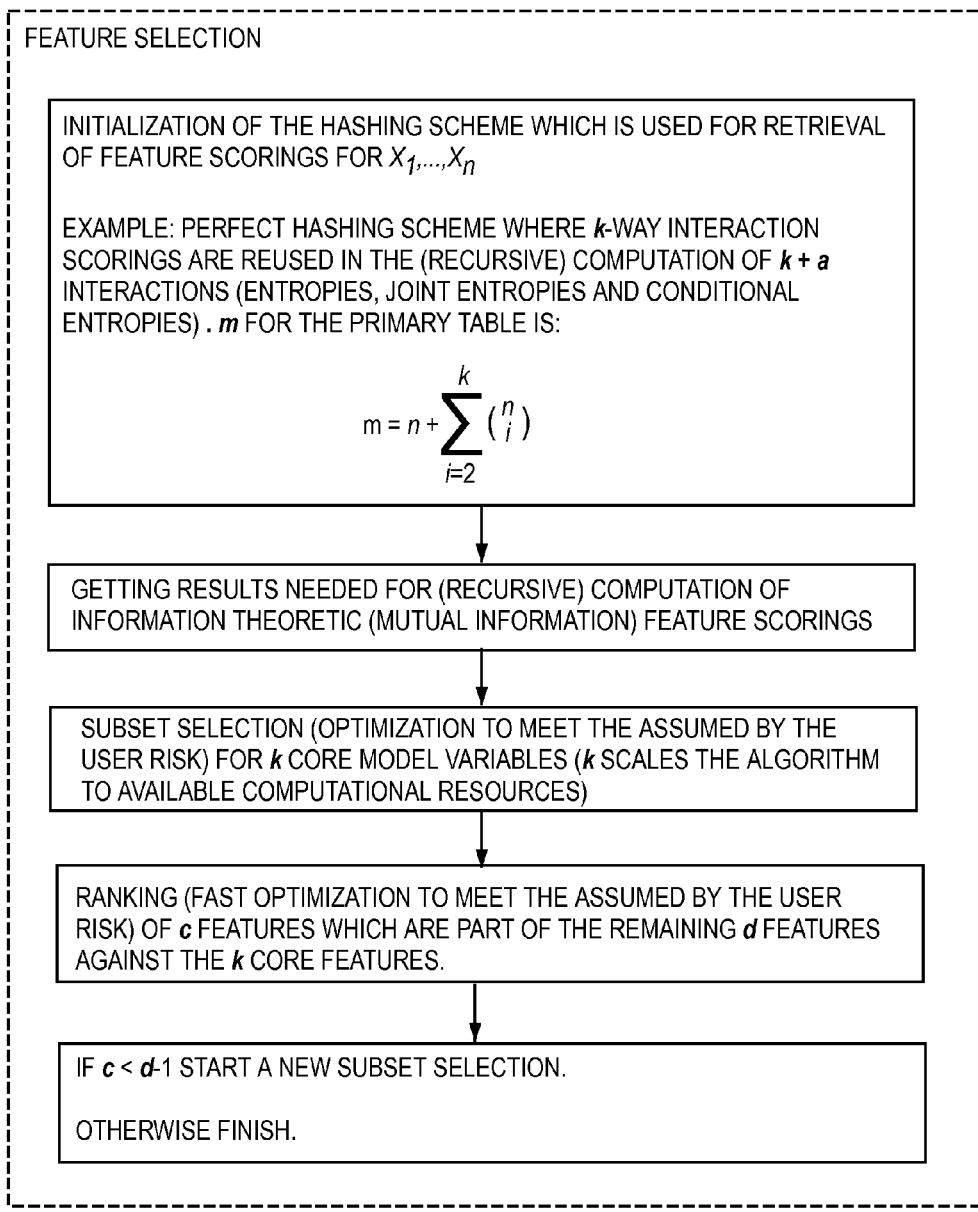
FIG. 8 is a flowchart depicting feature selection within an integrated data network in conjunction with the method and methodology of this invention.

Persons skilled in the arts of statistics and modeling will understand the feature selection and ranking elements of this invention with reference to FIGS. 8, 9, 10, and 11. FIG. 8 is a flowchart depicting an example of feature selection within the method and methodology of this invention. Persons skilled in the art of statistical modeling will appreciate the recursive nature of this phase of the methodology. Specifically, the operator will start with a hashing scheme to define a certain number of feature interactions. A subset of features and interactions will be determined as a function of computational resources and rankings will be established. Subset selection continues until statistical limits have been reached. This process allows the operator to make objective determinations of which features within an integrated data network should be selected, rather than relying on the operator's own subjective biases for that selection. The interactions of features as defined by the foregoing allows for this objectivity.

Figure 10:
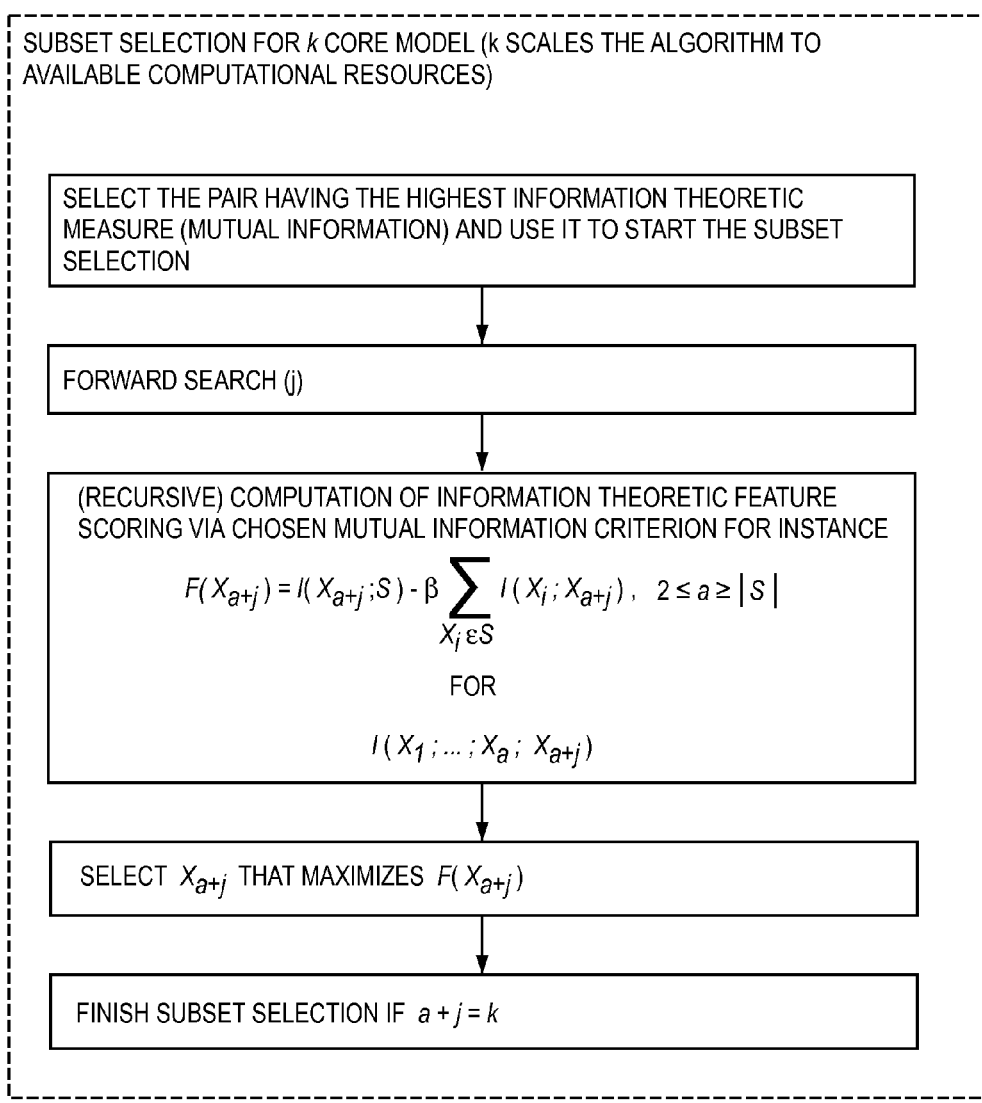
FIG. 10 is a flowchart depicting the recursive calculations required to select certain core variables within the mathematical model of the present invention.

FIG. 9 is a flowchart showing how various features (i.e. data streams) generated within an integrated data network could be ranked against other core features. As shown in FIG. 9, selected subset of core features will have a finite value k. Ranking the remaining set of features d against the subset k requires computing the mutual information of the features d according to the recursive formula depicted in FIG. 9. Selection of the k core variables is depicted in FIG. 10, pursuant to the analogous recursive formula depicted in this Figure. As is known to persons skilled in the arts, prior art systems that have been used to develop advanced models for network performance require substantial amounts of computational resources. The operator or engineer who is developing this model must account for these resources, in that models which require an excessive amount of resources will be impractical because they will not operate quickly enough to alert the operator of abnormal operations as they are detected. This inventions use of mutual information in the manner described herein overcomes this resource allocation problem and both optimizes and minimizes computational resource needs.

Figure 11:
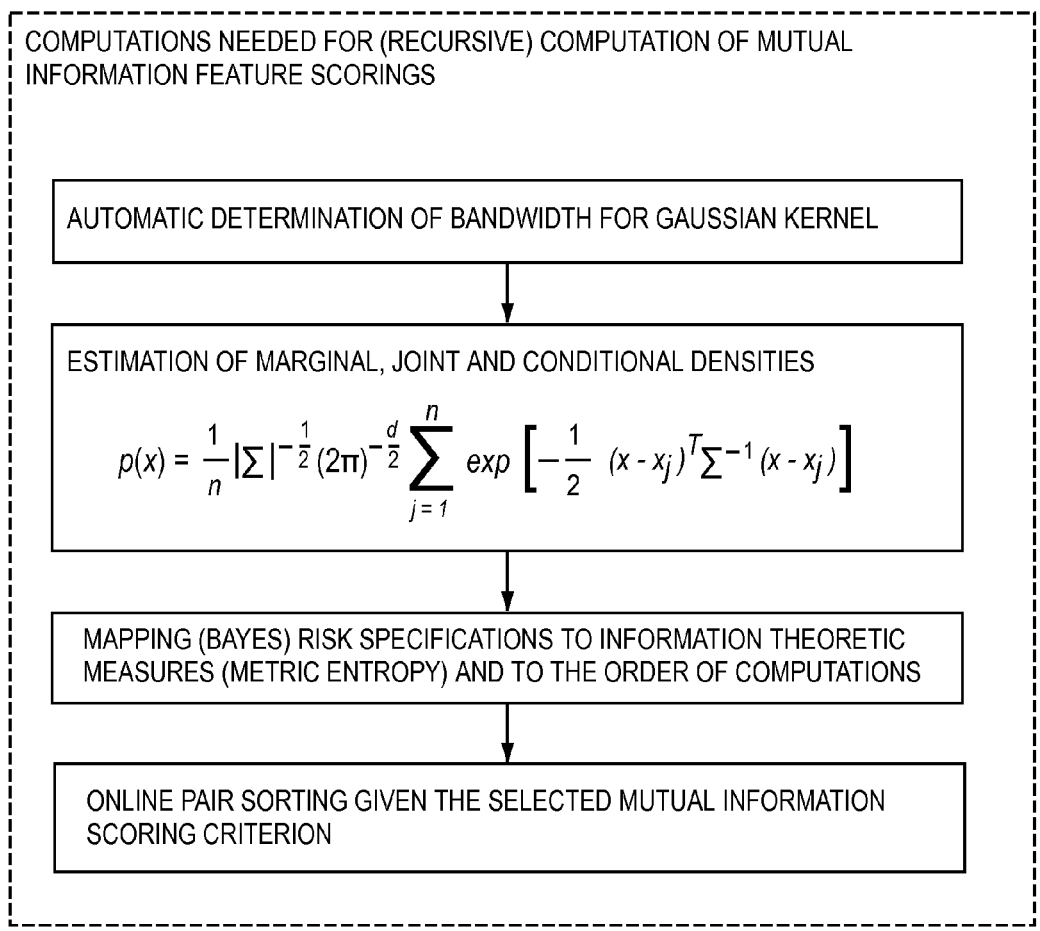
FIG. 11 is a flowchart representing the number of calculations and amount of calculation resources that would be required to perform mutual information scorings.

FIG. 11 is a flowchart that depicts the computations required to establish scorings of features via mutual information analysis. The formula depicted in FIG. 10 for the estimation of marginal, joint and conditional data densities will be applied against data sets that may include tens of millions of data points, if not more. It will be apparent to persons with even a marginal familiarity in the art that this computational step, in itself, is substantial. This invention's ability to reduce and minimize this computational and resource need is a critical advancement over the prior art.

After various data streams have been organized and analyzed in this manner, the method and methodology of this invention utilizes locality-sensitive hashing ("LSH") to cluster various data groups into an appropriate order and to identify the most probable operational states within the system. LSH maps data sets of variable lengths into data sets of a fixed length. Thus, for example, a stream of data representing power output from a turbine over a particular period of time could be mapped or "hashed" into a single integer, which facilitates fast and efficient clustering of interrelated or correlated data streams. Data input items will be hashed in this manner so that similar items are mapped into the same clusters or buckets, with the probability of similarity being relatively high. The totality of the clusters then defines a universe of relevant states for the underlying parameters.

Figure 12:
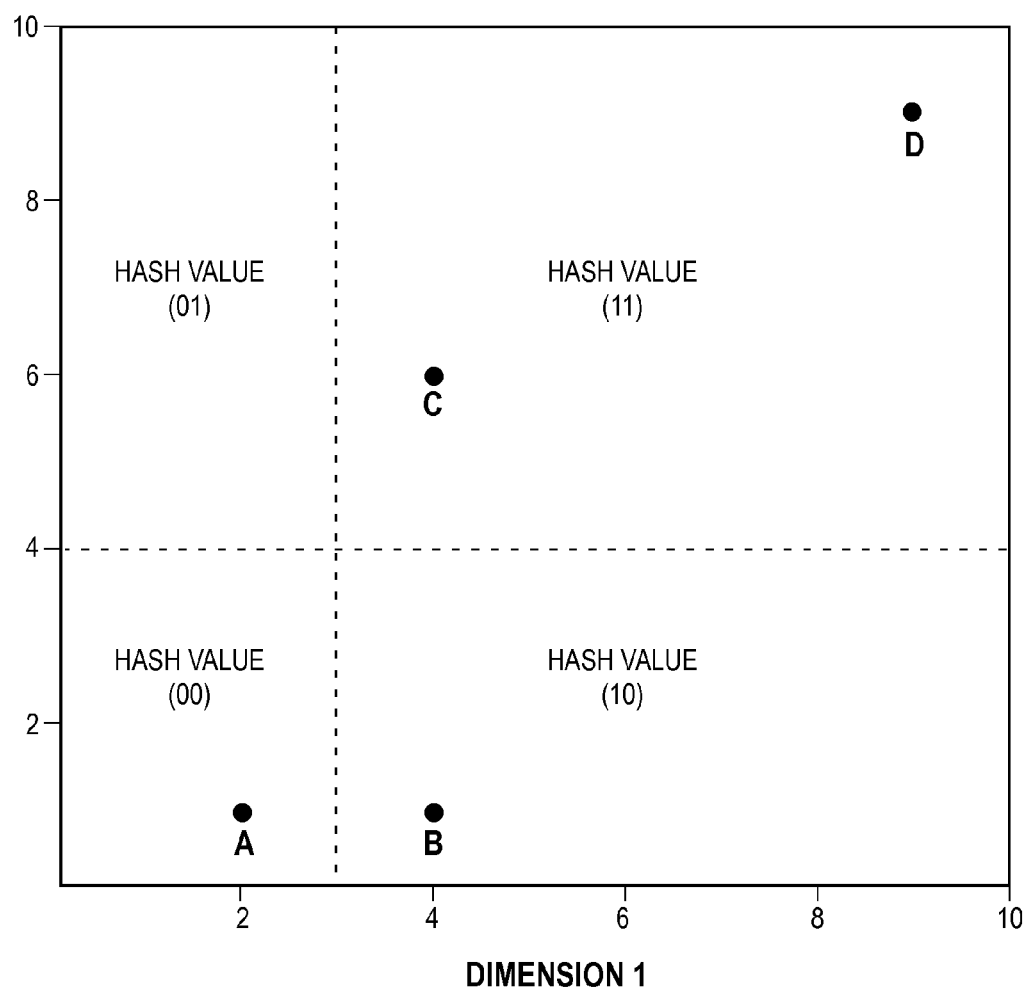
FIG. 12 is a two-dimensional representation of a locality sensitive hashing ("LSH") hash function.

An analysis of a two-dimensional LSH case is shown in FIG. 12. The LSH hash function (i.e. the algorithm that maps variable-length data to a fixed length) cuts a multi-dimensional space into cells by a certain number of hyperplanes, which themselves divide the space into "half-spaces". The "hash value" of each cell in FIG. 5 is depicted in each cell. FIG. 12 depicts a situation in which two relatively close data points A and B are assigned to different cells. Within the system and methodology of the present invention, the operator can adjust the density determination per the density function formula:

$$f^D(x) = \frac{1}{nh}\sum_{i=1}^{n} K\left(\frac{x-x_i}{h}\right)$$

This adjustment will reduce or eliminate many of the situations depicted in FIG. 12, in which relatively close data points are assigned to different cells. Ultimately, the reduces the number of false abnormal operation signals that the system and methodology may return while monitoring an integrated data network.

LSH mapping provides a fast and efficient mechanism to identify the data streams that can be clustered or combined for the mathematical modeling process. When combined with entropy theory, LSH mapping will identify the data sets that should be clustered first and entropy analysis then identifies the data sets that can be eliminated from the overall model. This reduces the run time for analyzing the system and speeds the process for creation of the mathematical model.

Figure 13:
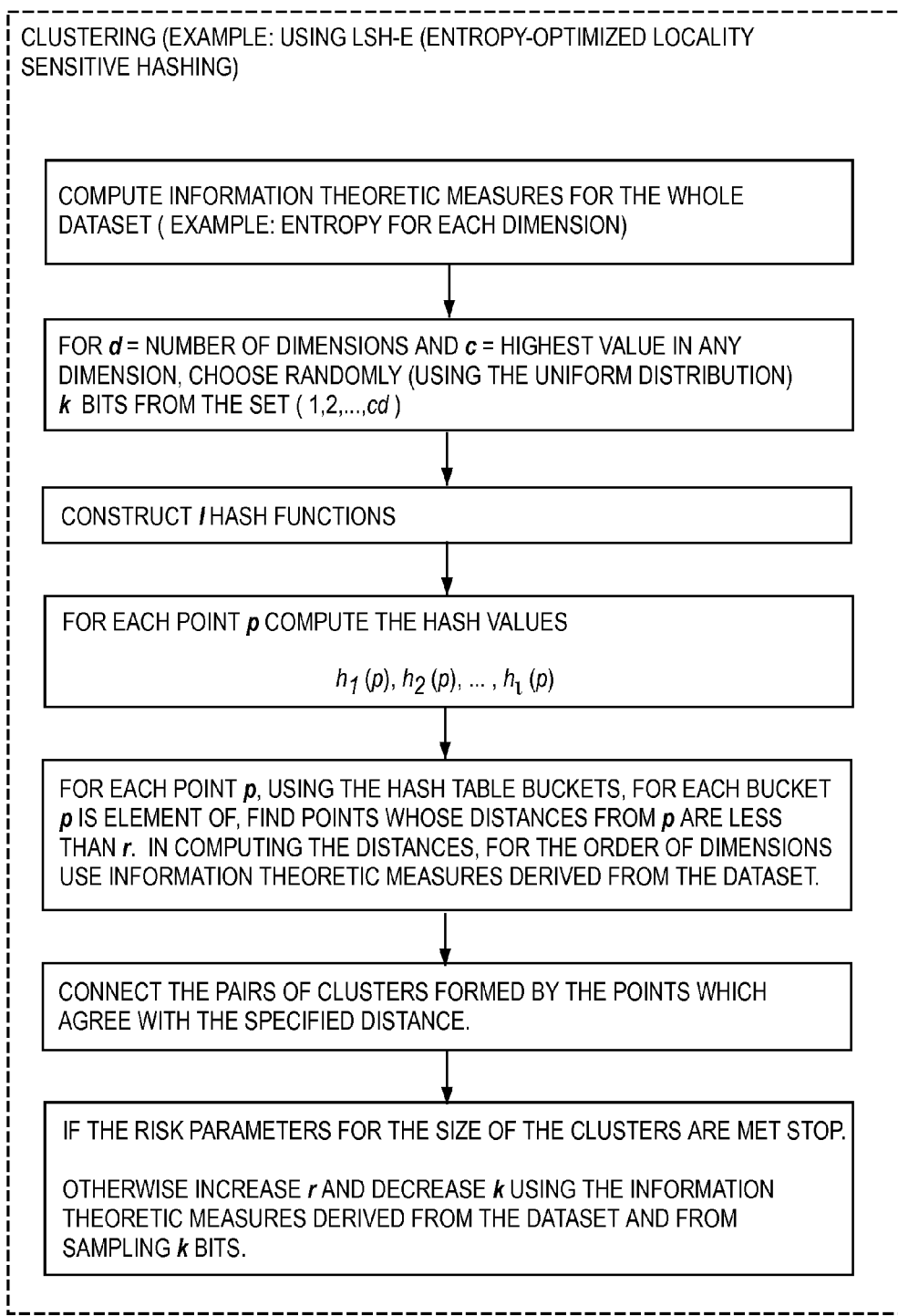
FIG. 13 is a flowchart depicting the construction, development, and use of hash functions within the methodology of the present invention.

The clustering methodology utilized in this invention is depicted in the flow chart shown in FIG. 13. Initially, the entropy or uncertainty level for each particular variable is computed, followed by construction of a quantity of hash functions (a hash function is an algorithm that maps data of an arbitrary length into data of a fixed length). The hash functions are then used to create a finite series of data "buckets", thus allowing the distance from each data point to the data buckets to be determined. Data points that are within a selected distance r from each bucket are then clustered for analysis within the method and methodology of this invention.

The LSH methodology of this invention constructs hash functions based on a specific encoding scheme. As noted herein, several hash functions may be used in order to minimize the probability that distant points are assigned to the same hash bucket. In the method and methodology of this invention, LSH is used to facilitate the clustering process, which in its turn forms an abstracted state space of operational modes for a component in the multi-variable system. In order to preserve the underlying meaning of the original/input space into the abstracted state space LSH-aided clustering uses a unique combination. It associates records to clusters only if they minimize the conditional entropy of the space being clustered and the input space.

The prior art, in part, teaches alternate methodologies to define and determine relevant states for the creation of a system model. The present invention improves upon this teaching by utilizing conditional entropy theory within the hashing function to minimize the distortion and degradation of the relevant states. Relevant states defined by the prior art are susceptible to distortion if clustered data streams are not grouped according to appropriate interrelationships and correlations. Additional distortion creeps into the system model when data sets are not correctly clustered or data interrelationships and pairings are assumed when the interrelationship does not, in fact exist. The present invention avoids these traps by utilizing generalized mutual information and conditional entropy to classify data parameters into proper subspaces, that are then "hashed" into clustered spaces. This, in turn, induces a high probability for invariance when those subspaces are organized into the appropriate clustered states.

In many prior art analytical systems, the volume of data that can be considered in creating the mathematical model will frequently overwhelm and add significant amounts of irrelevant "data noise" into the system. This extra data will mask what may be real problems within the system. Eliminating or filtering the noise, which the system of the present invention accomplishes via its mutual information and conditional entropy components, will create a more precise model of standard operations under multiple sets of conditions, which facilitates the later identification of system problems or anomalies. Further, the coding taught by the system and methodology of this invention facilitates a significantly faster search for a comparable state against which to test new data as that data is generated within an integrated data network.

The system of the present invention continuously monitors, measures and records data as an integrated data network generates that data. The continuous measurement of a system's operations can introduce new information into the mathematical model, particularly as the data network transitions from state to state. If the mathematical model for the data network is not developed to eliminate system distortion and noise, it will be difficult if not impossible to select an anomalous state from the multiple new states that are recorded for the network. Even when that state is selected, the amount of search time and CPU capacity required to select it via one of the prior art systems will be overwhelming. If, however, data streams are properly correlated in the early stages of the model's construction, the new data that is collected and added to the system will alter the model only to the extent that it is within the data clusters and correlations that have been quickly and efficiently identified.

Multi-variable systems with extensive amounts of data may have datasets which consist of hundreds of thousands or even millions of records. At the same time the criticality of the process of anomaly detection dictates that the online monitoring application should be very fast in labeling the incoming measurements as normal or abnormal. This invention is distinct from techniques proposed in the prior art in that it describes a unique combination of LSH with conditional entropy to assign system optimized codes to each operational mode. Thus the new measurement is associated or not with a mode in constant time and no search is involved. This substantially increases the speed of anomaly detection.

The present invention relies upon a large data set to create the optimum system model that reflects normal operation of an integrated data network. In part, the need for a large universe of data is driven by entropy in a dataset. When dataset entropies are high, a greater level of uncertainty will be inherent in the signals that are monitored by the system model. That is, with more uncertainty, there will be less precision in the classification of a particular signal as normal or abnormal. Uncertainty can be reduced by adding more data to the dataset.

The entropy of a system is defined as:

$$H(X) \triangleq -\sum_{x \in R_x} p(x) \log_2 P(x)$$

Figure 14:
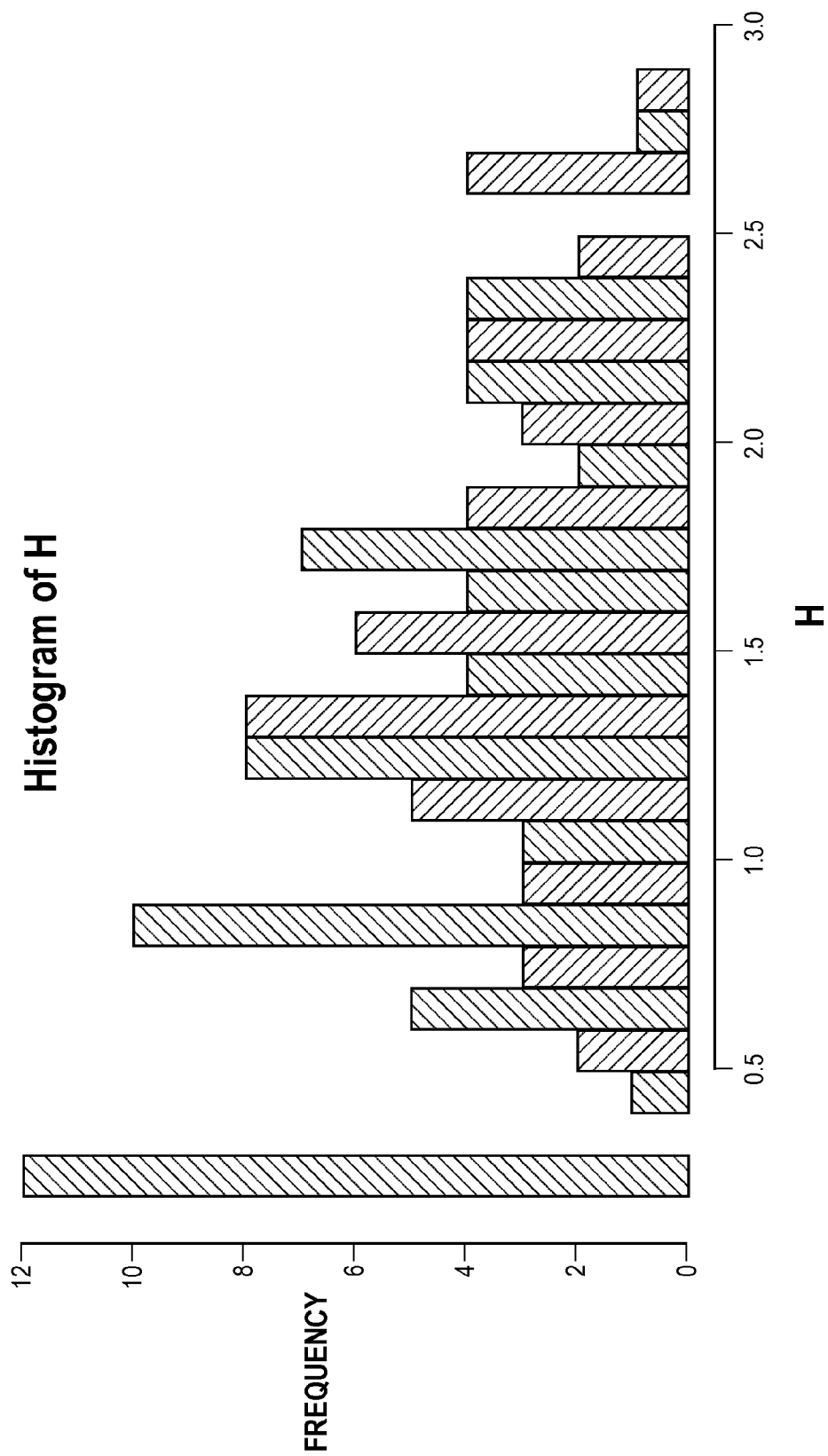
FIG. 14 is a sample histogram showing entropy within a dataset.

FIG. 14 depicts a histogram of entropies in a representative database. The frequencies of signals of dubious certainty, as shown on the y-axis in FIG. 6, is an almost random distribution across specific x-axis values. Adding more data to the dataset will increase the clusters and the LSH hashing functions required to analyze the system, which further increases the complexity of the model. This poses a very real risk of overfitting data into certain clusters. The system and methodology of this invention eliminates this overfitting risk with a Fano's inequality analysis, which relates the average information lost in a noisy data channel to the probability of a categorization error. This eliminates higher-value individual entropies as a function of the underlying interdependence structures within a particular dataset. It also facilitates a faster classification by reducing the number of longer clusters.

The state space specification of the mathematical model creation technique of the present invention is also used as a residual generating component. In another embodiment, the residual generating component utilizes the process version of a Kalman filter. Once the residual from the incoming current measurement has been calculated the decision on the signature of this particular residual is made based on a probability distribution of all residuals. In one embodiment the confidence interval is derived from the results of the conditional entropy based subset selection. In another embodiment a sequential probability ratio test is used for the statistical analysis of the residuals.

Figure 15:
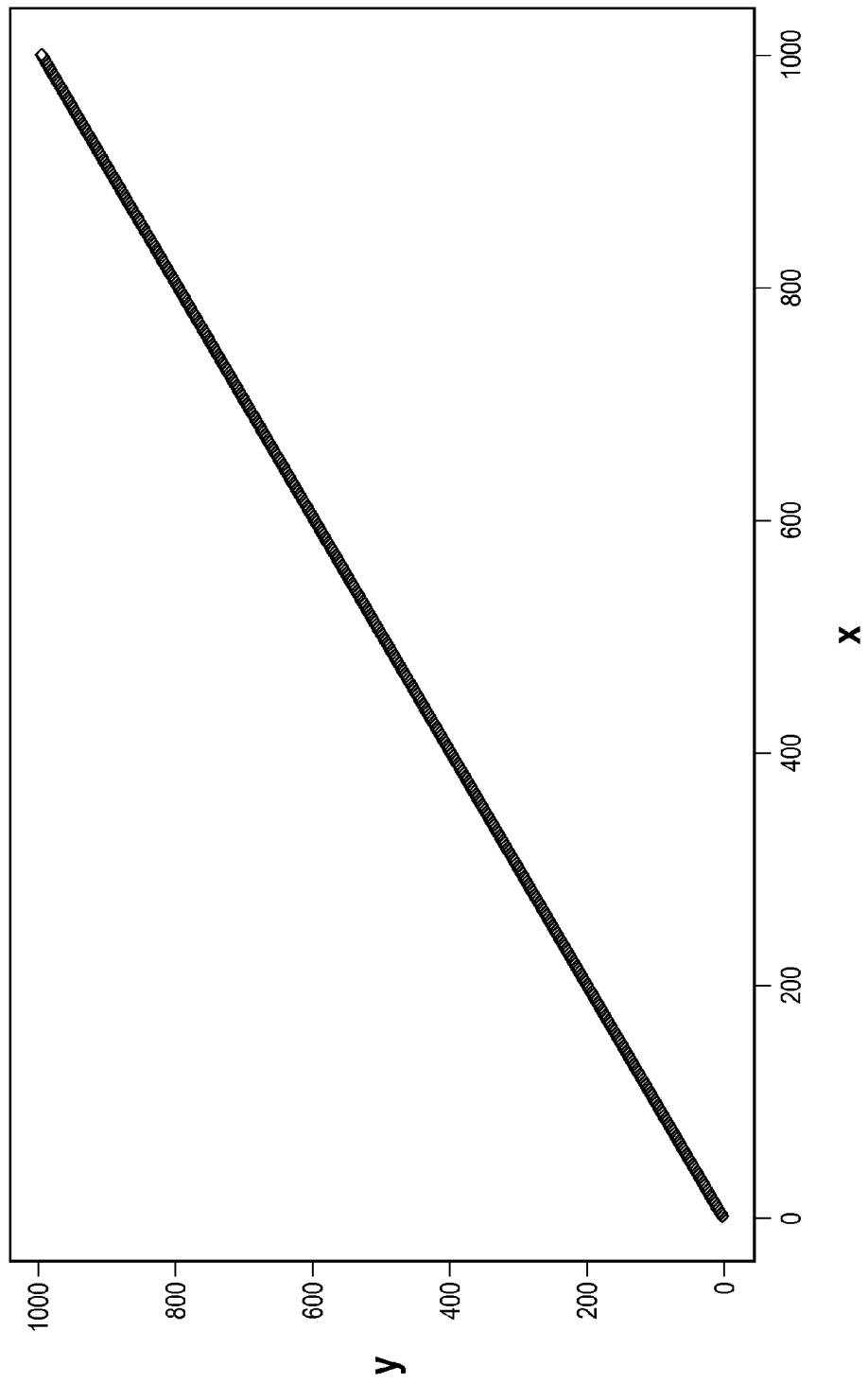
FIG. 15 is a graphical depiction of state transitions as those transitions may be represented in prior art systems.

The large amount of data that is collected and utilized to form the mathematical model for any integrated data network can create a "state space explosion" problem, which reduces the utility of the model by forcing the consideration of an unacceptably high number of states. FIG. 15 depicts the linear growth of state transitions, commonly seen with prior art monitoring technology. State space explosion is characterized by high signal entropy, high dimensionality and high feature irrelevance, all of which can combine to reduce the reliance of a system's ability to detect an abnormal signal and to decrease the speed with which a system can make that detection. For example, a system that monitors 100 variables across 50 operational bands can theoretically generate $100^{50}$ coded clusters.

The system and methodology of this invention handles this state space explosion problem differently than does the prior art. A number of states will be stable and will represent predictable integrated data network behavior. As noted, the present system and methodology achieves feature selection as a function of mutual information, then clusters data using Fano's inequality to minimize distortion and reduce type II errors. When this technique is used, the same input that generates the steadily-increasing state space explosion, as shown in FIG. 14, will produce a more manageable set of clusters, as depicted in FIG. 15.

Figure 16:
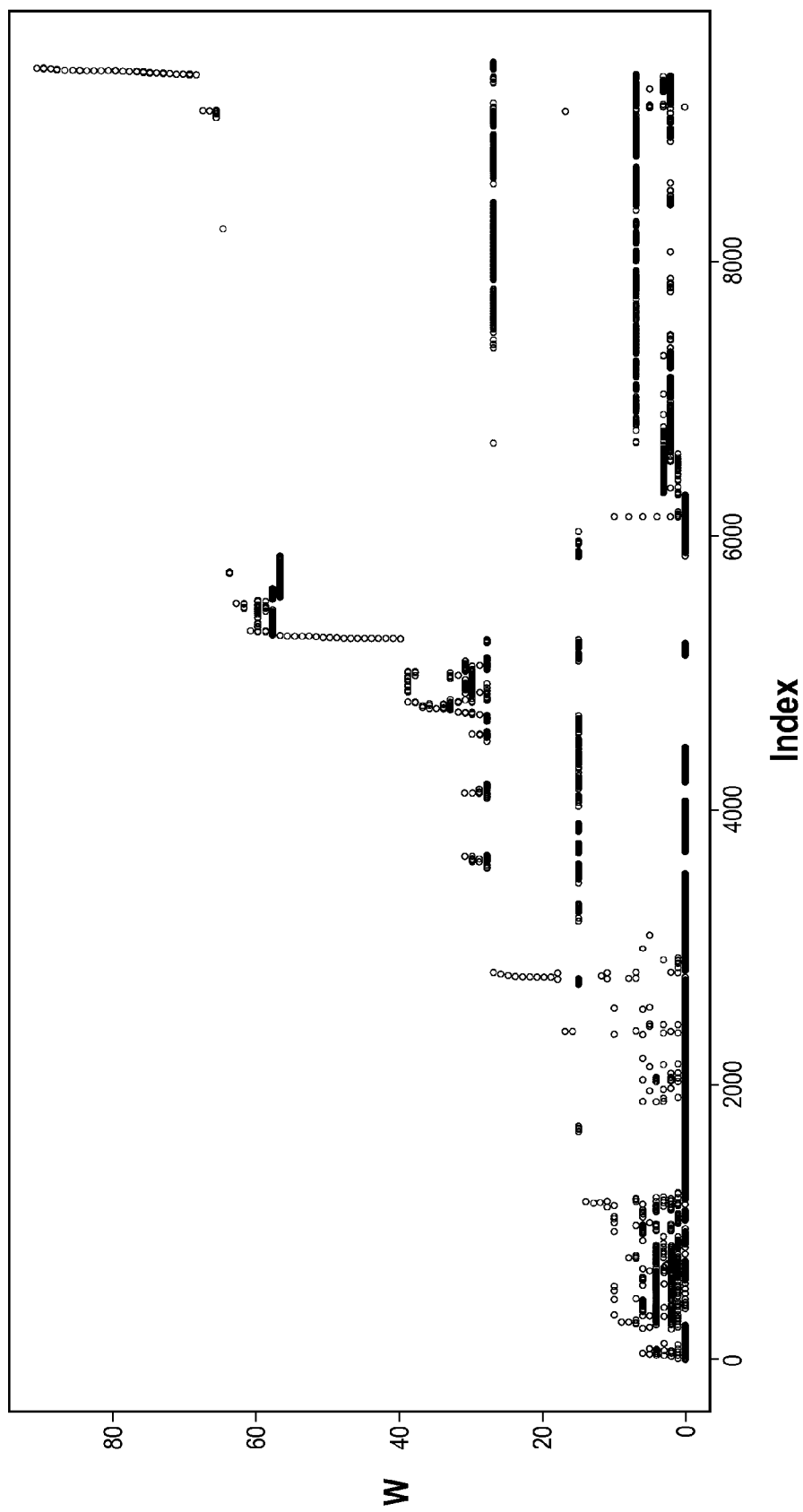
FIG. 16 is a graphical depiction of how state transitions are represented by the technology described in the present specification.

The integration of the various information theory techniques (i.e. conditional entropy, mutual information, conditional mutual information, and multi-dimensional mutual information) that are incorporated into this invention is depicted in FIG. 16. Conditional entropy is defined as:

$$H(X \mid Y) \triangleq -\sum_{x \in R_x} P(x) \log_2 P(x)$$

Mutual information is defined as:

$$I(X;Y) \triangleq \sum_{x \in R_x, y \in R_y} P(x,y) \log_2 \frac{P(x,y)}{P(x)P(y)}$$

Conditional Mutual Information is defined as:

$$I(X;Y \mid Z) \triangleq \sum_{x,y,z} P(x,y,z) \log_2 \frac{P(x,y \mid z)}{P(x \mid z)P(y \mid z)}$$

Finally, multi-dimensional mutual information is defined as:

$$I(X;Y;Z) \triangleq -H(X)-H(Y)-H(Z)+H(XY)+H(XZ)+H(YZ)-H(XYZ)$$

Figure 17:
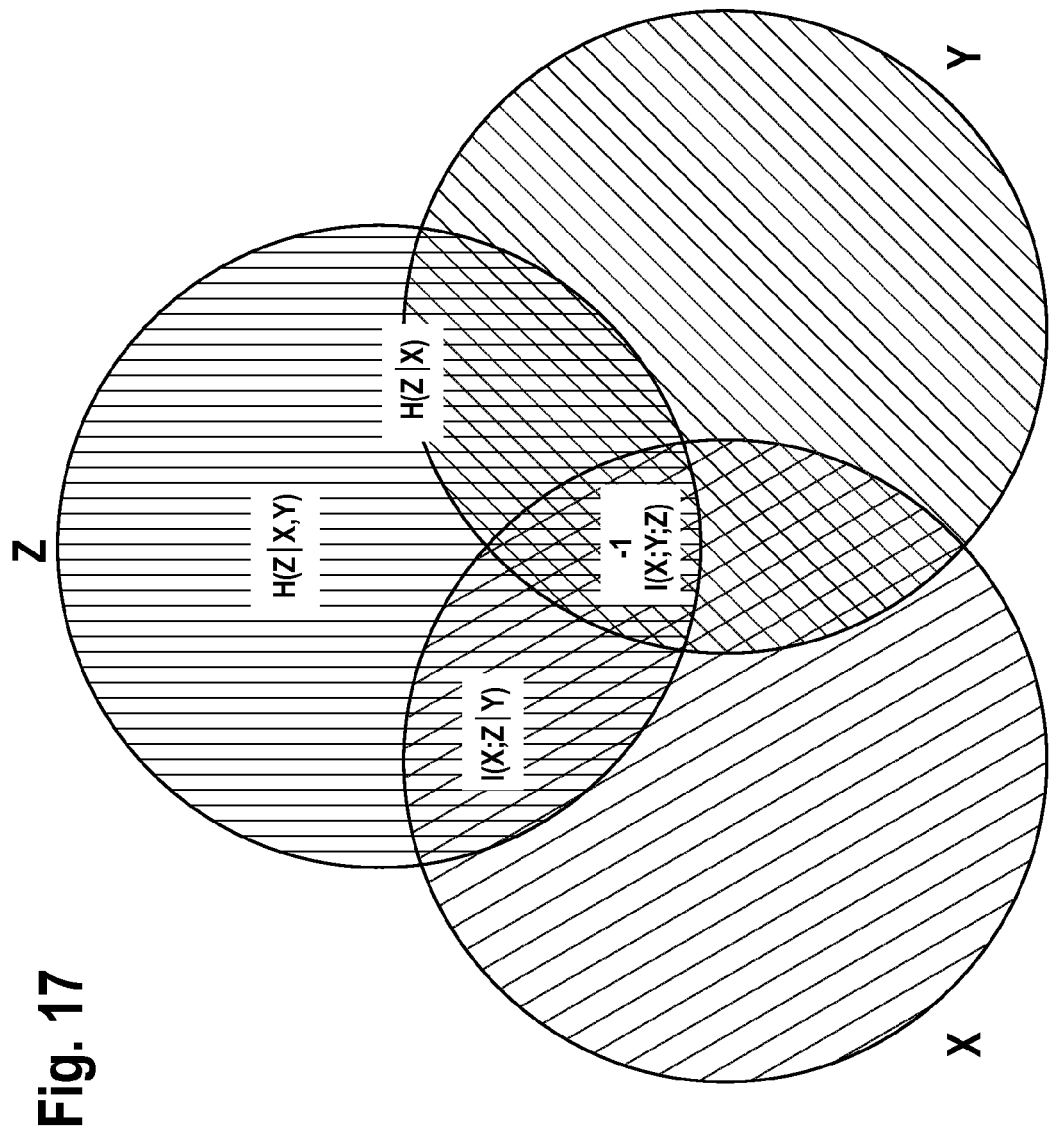
FIG. 17 is a Venn diagram representation of the measurements of information that are utilized in the present invention.

As shown in FIG. 17, multi-dimensional mutual information may have a negative value. The system and methodology of this invention allows an integrated data network administrator to make subtle adjustments among the communications pathways between various components of a network. Negative multi-dimensional mutual information values, such as that shown in FIG. 17, may be the result of a small amount of pair-shared interactions, which interactions may nonetheless be involved in strong multi-component interactions. That is, relatively insignificant interactions between two specific components may cause significant interactions in a multi-component system. No other prior art anomaly detection systems are capable of identifying and capitalizing on these multi-dimensional interactions, as the prior art generally stops its analysis at paired interactions, where the relationship between paired variables is generally linear. The multi-dimensional mutual information analysis will uncover non-linear and non-parametric dependencies, thus increasing the reliability and ability of the system and methodology of this invention to classify operations as normal or abnormal.

Figure 18:
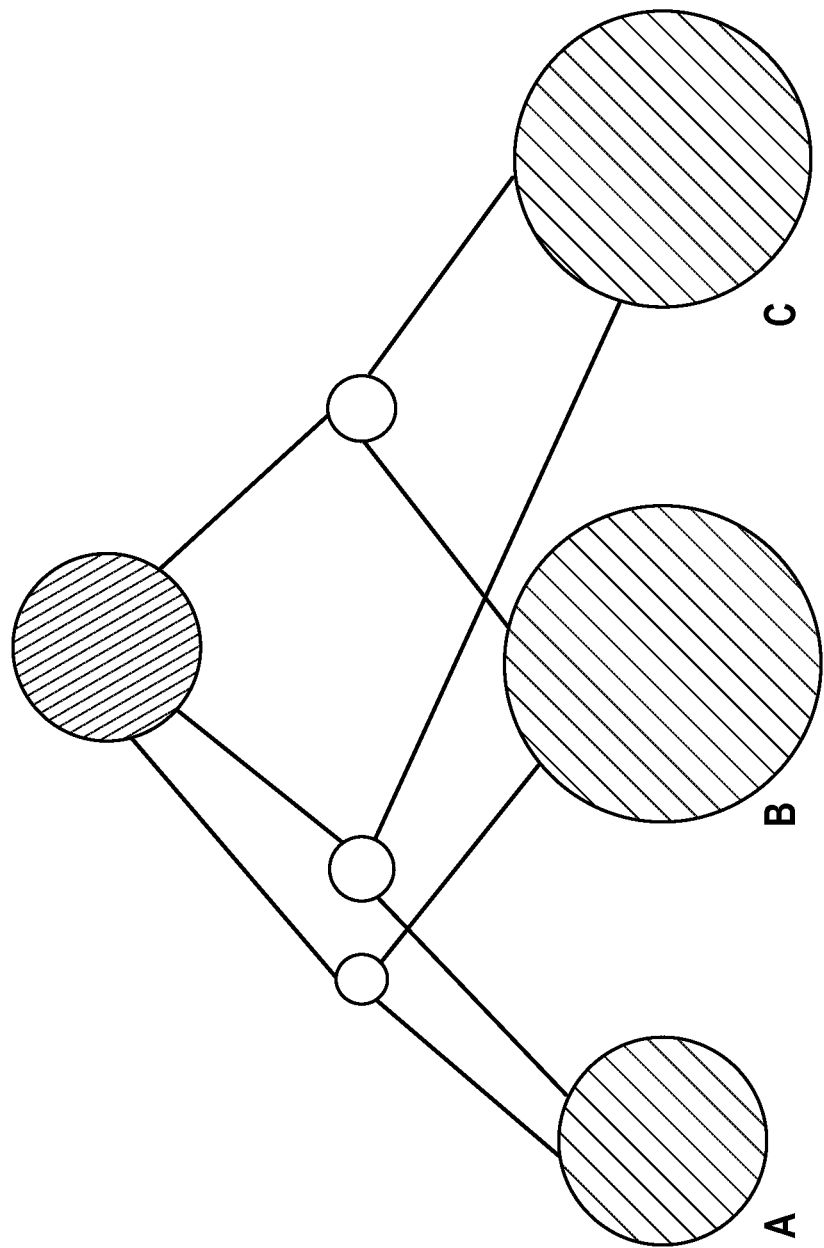
FIG. 18 is a visual representation of the synergistic interactions among data and variables as seen within the technology of the present invention.

These multi-dimensional synergistic interactions are depicted in the abstract in FIG. 18. The data subsets A, B, and C are shown as solid circles. Interactions between data subsets A and B, A and C, and B and C reveal no real synergy, as depicted by the empty circles at the paired connection interstices. Yet when the interconnectivity of those empty circles is considered, a high-level three-way interaction is revealed, as shown by the solid circle at the apex of interactions shown in FIG. 18. When this three-way interaction is identified, and more specifically when all multi-component, multi-dimensional interactions among data streams are identified in an integrated data network, the precision of classification of events as normal or abnormal is significantly increased.

Figure 19:
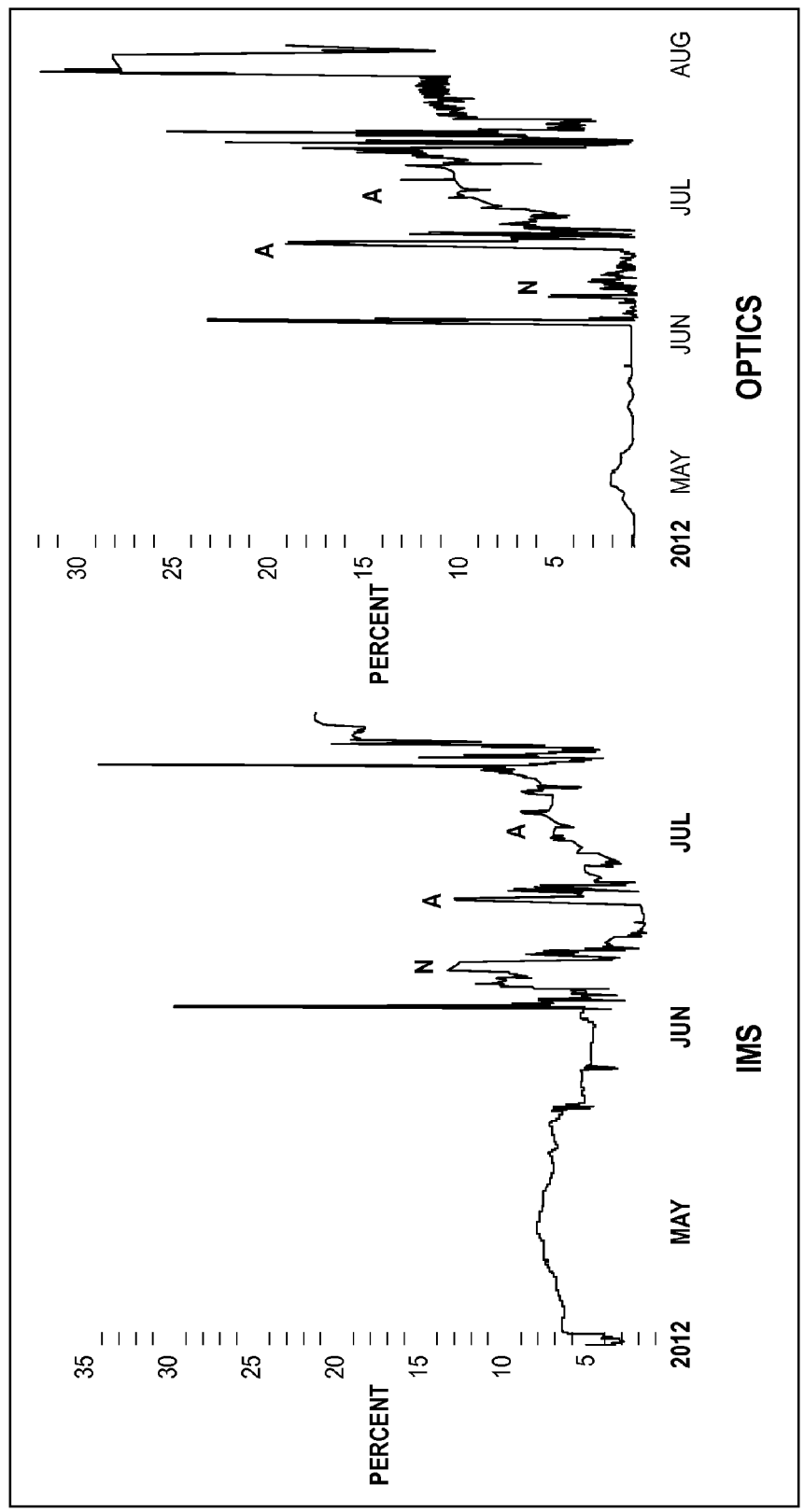
FIG. 19 is a side-by-side graphical comparison of the prior art and the technology of this invention.

FIG. 19 is a comparison of how a prior art anomaly detection system (shown on the left side of FIG. 19) might analyze an integrated data network with a parallel analysis (shown on the right side of FIG. 19) performed by the system and methodology of the present invention. On each of the two graphs, normal operation of the network is designated by the letter "N" and abnormal operation by the letter "A". In the early-June timeframe, the prior art in this example assigns a higher "Normal" value to the network's operations than does the system and methodology of this invention because it fails to detect a null hypothesis and to reject the prospect that an abnormal event may be occurring. By using a mutual information analysis and maximizing the possibility of multi-dimensional interactions, the present invention is better able to conclude that the network's operations in this timeframe are, in fact, normal. Similarly, the present invention uses this analysis to better highlight possible abnormal operations in the late June and early July timeframes in the example shown in FIG. 19.

The system and methodology of the present invention is ideally implemented via a standard computing machine-based data processor. Standard components of this machine include a database and data storage means to record and store large quantities of historical data that are generated by an integrated data network; means to measure and collect individual data points from multiple individual nodes within that network; integrated memory systems to store the software code that implements the system and methodology; one or more high-speed central processors to perform the data analysis per the instructions from the stored software code, output means to generate graphical depictions of the standard operating states of the network, and alarm means to notify an operator when the network is performing outside of its normal operating range. Persons skilled in the art will understand the details of configuring this data processor and of implementing the system and methodology of the present invention within the structure of that processor.

After the system and methodology of this invention have been implemented into a data processor and a mathematical model for the underlying integrated data parameter network has been generated, the network may then be monitored. The methodology of the invention continues to collect and store data from each of the nodes of the system. That data is processed as described above in the specification but is also subjected to a comparison with the model. The user can define operational parameters such that the methodology will compare real-time data with the historical mathematical model. If the real-time data is outside of the user's statistical tolerances, the methodology alerts the user to confirm the occurrence of an anomaly.

The ultimate goal of the system and methodology of this invention is to allow an operator to monitor an integrated data network and to distinguish when a set of data measurements is within the expected range of operations for a given set of conditions from a situation when the network is experiencing an anomaly. The specific form of mathematical modeling utilized in this invention eliminates a large number of false positives and provides an operator with a clear picture of the network operations.

For example, consider a wind turbine farm in which an engineer may monitor power output from a particular turbine or the operating temperature of an inverter. The engineer may collect data under different operating states (e.g. extreme temperatures, precipitation, etc.). Data for multiple operating states will be collected and stored to create the historical database, and that data will be used to build the mathematical model that represents normal operating states of the integrated data network.

If the mathematical model were constructed manually, the selection of data that will be mapped and the operating state reflected for each curve will mirror the biases and expectations of the engineer who is building it. The engineer may expect power output and inverter temperatures, for example, to have a close linear relationship, and he or she will create data curves reflecting such a relationship. The system and methodology of the present invention, however, is immune to these biases. Rather than build data curves that are based on an operator's assumption, the system and methodology of this invention tests data pairs and groupings under mutual information and conditional entropy analyses. The operator can effect this testing by directing the system and methodology to accept tighter or looser correlations, but the system will eliminate false correlations and will recognize genuine relationships that the engineer otherwise might have missed.

When new data is collected at any node within the network, that data will be mapped against the various operating states reflected within the mathematical model. Mutual information analysis facilitates a faster and more accurate search to finds the closes match for new data measurements. If the new data falls outside of the expected values as predicted by the mathematical model, the system and methodology then determines what had changed and whether that change can be considered to be within or outside of normal operations for the network. The system's "hashing" functionality facilitates this analysis by analyzing those data spaces that have been "hashed" under similar operating states. If the system determines that the new data reflects an anomaly, the operator or administrator can then focus on that particular data range to determine what, if anything, is wrong.

All references and documents mentioned in this specification are indicative of the level of those skilled in the art to which this invention pertains. Headings in the specification document are included solely for ease of review of the document and are not intended to be a limitation on the contents of the document in any way.

Although the foregoing invention has been described in some detail by way of illustration and example for purposes of clarity of understanding, it will be obvious that certain changes and modifications may be practiced within the scope of the appended claims.

The invention claimed is:

1. A system for detecting anomalies in the overall functions and operation of an integrated data network, said integrated data network comprising a plurality of individual components, each of which components produces a regular stream of one or more data points reflecting specific aspects of the function and operation of said component, wherein said streams of data points have varying degrees of interrelationships such that the values of one stream of data points may affect the values of one or more other interrelated data streams, said system for detecting anomalies comprising:

A processor to perform the steps of:

Constructing a mathematical model to represent the standard operation of said integrated data network over a plurality of standard operating conditions, the construction of said model comprising an analysis of the data streams produced by the components of said integrated data network over a period of time, said analysis further comprising selecting one or more groupings of data streams generated by one or more of said components and quantifying the interdependence of said streams via a multi-dimensional mutual information theory, said analysis being further enhanced by the utilization of locality sensitive hashing to cluster interrelated data streams;

Creating one or more graphical depictions of said integrated data network, each of which graphical depictions representing the standard operation of said integrated data network under a specific set of operating conditions;

Measuring current data being generated by at least one of the components of said integrated data network and mapping said current data onto a distinct graphical depiction of said current data, which distinct graphical depiction is then overlaid onto the graphical depiction of said standard operation of said network under similar operating conditions; and Detecting anomalies in the operation of said integrated data network by comparing said graphical depictions, said anomalies being those aspects of said current graphical depiction that are not within the operating range of said standard graphical depiction.

2. The system of claim 1, further comprising continual adjustment and modification of said mathematical model via the inclusion of said current data into said model.

3. The system of claim 1, further comprising the deletion of data from said mathematical model, said deletion being a function of a separate determination that said deleted data is not interrelated with other data in said model.

4. The system of claim 1, wherein a user can adjust the threshold values that are used for determining the interrelations between data streams, said adjustment facilitating broader or narrower conclusions as to said interrelationships.

5. The system of claim 1, further comprising a simultaneous analysis of the interrelationship of three or more data streams within the first step of the construction of said mathematical model.

6. The system of claim 1, wherein the functions that are implemented via locality-sensitive hashing are determined by the relative density of said data streams that are being analyzed.

7. A tangible computing apparatus for storing data streams from individual nodes of an integrated data network onto a hardware platform and for analyzing said data streams per a set of instructions that are also stored in said computing system, wherein said instructions, executed by a processor, cause the computing system to construct a mathematical model on said hardware platform that depicts the function and operation of said integrated data network across a plurality of standard operating conditions, wherein the construction of said mathematical model utilizes multi-dimensional mutual information theory to compare two or more individual data streams to determine the level of interrelationship between or among said data streams, said mathematical model accepting only those interrelationships that exceed a specified interrelationship coefficient, said computing system being further configured to monitor said integrated data network after construction of said mathematical model and to compare the ongoing operations of said integrated data network with said standard operating conditions as depicted by said mathematical model, said monitoring being set to alert a user when the current operations deviate from standard operating conditions.

8. A method for detecting anomalies in the overall functions and operation of an integrated data network, said integrated data network comprising a plurality of individual components, each of which components produces a regular stream of one or more data points reflecting specific aspects of the function and operation of said component, wherein said streams of data points have varying degrees of interrelationships such that the values of one stream of data points may affect the values of one or more other interrelated data streams, said method for detecting anomalies comprising: Constructing a mathematical model to represent the standard operation of said integrated data network over a plurality of standard operating conditions, the construction of said model comprising an analysis of the data streams produced by the components of said integrated data network over a period of time, said analysis further comprising selecting one or more groupings of data streams generated by one or more of said components and quantifying the interdependence of said streams via a multi-dimensional mutual information theory, said analysis being further enhanced by the utilization of locality sensitive hashing to duster interrelated data streams; Creating one or more graphical depictions of said integrated data network, each of which graphical depictions representing the standard operation of said integrated data network under a specific set of operating conditions; Measuring current data being generated by at least one of the components of said integrated data network and mapping said current data onto a distinct graphical depiction of said current data, which distinct graphical depiction is then overlaid onto the graphical depiction of said standard operation of said network under similar operating conditions; and Detecting anomalies in the operation of said integrated data network by comparing said graphical depictions, said anomalies being those aspects of said current graphical depiction that are not within the operating range of said standard graphical depiction.

9. The method of claim 8, further comprising continual adjustment and modification of said mathematical model via the inclusion of said current data into said model.

10. The method of claim 8, further comprising the deletion of data from said mathematical model, said deletion being a function of a separate determination that said deleted data is not interrelated with other data in said model.

* * * * *